(12) United States Patent
Blanco et al.

(10) Patent No.: US 11,992,886 B2
(45) Date of Patent: May 28, 2024

(54) CONTROLLER FOR A TOOL DRIVE AND METHODS FOR USING A TOOL DRIVE

(71) Applicant: The Boeing Company, Chicago, IL (US)

(72) Inventors: Jose A. Blanco, Madrid (ES); Andreas Bartl, Munich (DE); Tobias Weber, Munich (DE)

(73) Assignee: The Boeing Company, Arlington, VA (US)

( * ) Notice: Subject to any disclaimer, the term of this patent is extended or adjusted under 35 U.S.C. 154(b) by 108 days.

(21) Appl. No.: 17/814,564

(22) Filed: Jul. 25, 2022

(65) Prior Publication Data
US 2024/0024964 A1 Jan. 25, 2024

(51) Int. Cl.
*B23B 39/10* (2006.01)
*B25J 11/00* (2006.01)

(52) U.S. Cl.
CPC .......... *B23B 39/10* (2013.01); *B25J 11/0055* (2013.01)

(58) Field of Classification Search
CPC .............. G05B 19/401; G05B 19/4083; G05B 19/404; G05B 2219/37037; G05B 2219/40293; G05B 2219/49207; G05B 2219/39033; G05B 2219/50057; G05B 2219/37275; G05B 2219/50166; G05B 2219/37043; G05B 2219/36503; G05B 2219/37036; G05B 2219/37211; G05B 2219/37304; G05B 2219/49221; Y10T 409/303808; A61B 2090/064; A61B 2034/301; A61B 2017/00477; A61B 34/71; A61B 46/10; A61M 25/0147; A61M 2205/332; B23B 39/10
See application file for complete search history.

(56) References Cited

U.S. PATENT DOCUMENTS

| | | | | |
|---|---|---|---|---|
| 6,845,340 | B2 * | 1/2005 | Edie | ................... B23Q 17/0971 |
| | | | | 702/179 |
| 6,859,747 | B2 * | 2/2005 | Yutkowitz | ............ G05B 19/404 |
| | | | | 356/498 |
| 9,085,081 | B2 * | 7/2015 | Dickerson | ............... B23C 1/002 |
| 9,144,874 | B2 * | 9/2015 | Fronius | ................... B23C 9/005 |
| 9,676,019 | B2 | 6/2017 | Elford | |
| 2022/0179396 | A1 | 6/2022 | Elford | |

* cited by examiner

*Primary Examiner* — Nathaniel C Chukwurah
(74) *Attorney, Agent, or Firm* — Walters & Wasylyna LLC

(57) ABSTRACT

A controller for a tool drive that collects force data and displacement data from the tool drive. The controller generates a stiffness model representing a workpiece using the force data and the displacement data. The controller further collects a force signal from the tool drive. The controller determines deflection of the workpiece using the force signal and stiffness model. The controller determines a resonant frequency of the workpiece using the stiffness model. The controller modifies an oscillation frequency and/or a rotational frequency of a spindle of the tool drive based on the resonant frequency. The controller also determines a location of a tip of the tool drive using the force signal.

23 Claims, 19 Drawing Sheets

CONTROLLER FOR A TOOL DRIVE AND METHODS FOR USING A TOOL DRIVE

FIELD

The present disclosure relates generally to robotic machining and, more particularly, to a controller and method for using a tool drive, coupled to a robotic manipulator, as a sensor.

BACKGROUND

Automated machining operations typically utilize a robotic system operated under computer control. Robotic systems require calibration of a tool center point (TCP) relative to a cartesian coordinate system that is fixed relative to the robotic system. This calibration and subsequent computer-controlled movement of the tool center point requires accurate knowledge of a location of the tool center point and/or a location and orientation of a workpiece being machined. Inaccuracies in locating the tool center point or the workpiece can result in manufacturing quality issues or even damage to the robotic system. Additionally, certain types of workpieces, such as large aerospace structures, may be subject to deflection and vibration during the automated machining operation. Such deflections and vibrations can also result in manufacturing quality issues and a reduction in the service life of the manufacturing tool.

Accordingly, those skilled in the art continue with research and development efforts in the field of automated robotic machining.

SUMMARY

Disclosed are examples of a controller for a tool drive, a robotic machining system, and a method for using a tool drive. The following is a non-exhaustive list of examples, which may or may not be claimed, of the subject matter according to the present disclosure.

In an example, the disclosed controller includes instructions that are executable to collect force data from a control unit of the tool drive. The force data representing a force applied to a spindle of the tool drive in response to engagement of a tip of the tool drive with a workpiece. The controller includes instructions that are executable to collect displacement data from the control unit of the tool drive. The displacement data representing a displacement of the spindle of the tool drive in response to engagement of the tip of the tool drive with the workpiece. The controller includes instructions that are executable to generate a stiffness model representing the workpiece using the force data and the displacement data.

In another example, the disclosed the controller includes instructions that are executable to collect a force signal from a control unit of the tool drive. The force signal representing a force applied to a spindle of the tool drive in response to engagement of a tip of the tool drive with a workpiece. The controller includes instructions that are executable to collect a displacement signal from the control unit of the tool drive. The displacement signal representing a displacement of the spindle of the tool drive in response to engagement of the tip of the tool drive with the workpiece. The controller includes instructions that are executable to use the force signal and the displacement signal to determine a location of the tip of the tool drive relative to a fixed coordinate system.

In an example, the disclosed robotic machining system includes a robotic manipulator and a tool drive coupled to the robotic manipulator. The tool drive includes a spindle, a tip, and a control unit. The control unit is configured to provide force data from the tool drive. The force data representing a force applied to the spindle of the tool drive in response to engagement of the tip of the tool drive with a workpiece. The control unit is also configured to provide displacement data from the tool drive. The displacement data representing a displacement of the spindle of the tool drive in response to engagement of the tip of the tool drive with the workpiece. The robotic machining system also includes a controller including instructions that are executable to collect the force data from the control unit of the tool drive. The controller includes instructions that are executable to collect the displacement data from the control unit of the tool drive. The controller including instructions that are executable to generate a stiffness model representing the workpiece using the force data and the displacement data.

In another example, the disclosed robotic machining system includes a robotic manipulator and a tool drive coupled to the robotic manipulator. The tool drive includes a spindle, a tip, and a control unit. The control unit is configured to provide a force signal from the tool drive. The force signal representing a force applied to the spindle of the tool drive in response to engagement of the tip of the tool drive with a workpiece. The control unit is also configured to provide a displacement signal from the tool drive. The displacement signal representing a displacement of the spindle of the tool drive in response to engagement of the tip of the tool drive with the workpiece. The robotic machining system also includes a controller including instructions that are executable to collect the force signal from the control unit of the tool drive. The controller includes instructions that are executable to collect the displacement signal from the control unit of the tool drive. The controller includes instructions that are executable to use the force signal and the displacement signal to determine a location of the tip of the tool drive relative to a fixed coordinate system.

In an example, the disclose method includes a step of collecting force data from a control unit of the tool drive. The force data representing a force applied to a spindle of the tool drive in response to engagement of a tip of the tool drive with a workpiece. The method also includes a step of collecting displacement data from the control unit of the tool drive. The displacement data representing a displacement of the spindle of the tool drive in response to engagement of the tip of the tool drive with the workpiece. The method further includes a step of generating a stiffness model representing the workpiece using the force data and the displacement data.

In another example, the disclose method includes a step of collecting a force signal from a control unit of the tool drive. The force signal representing a force applied to a spindle of the tool drive in response to engagement of a tip of the tool drive with a workpiece. The method also includes a step of collecting a displacement signal from the control unit of the tool drive. The displacement signal representing a displacement of the spindle of the tool drive in response to engagement of the tip of the tool drive with the workpiece. The method further includes a step of determining a location of the tip of the tool drive relative to a fixed coordinate system using the force signal and the displacement signal.

Other examples of the disclosed controller, robotic machining system, and method will become apparent from the following detailed description, the accompanying drawings, and the appended claims.

DETAILED DESCRIPTION

Figure 1:
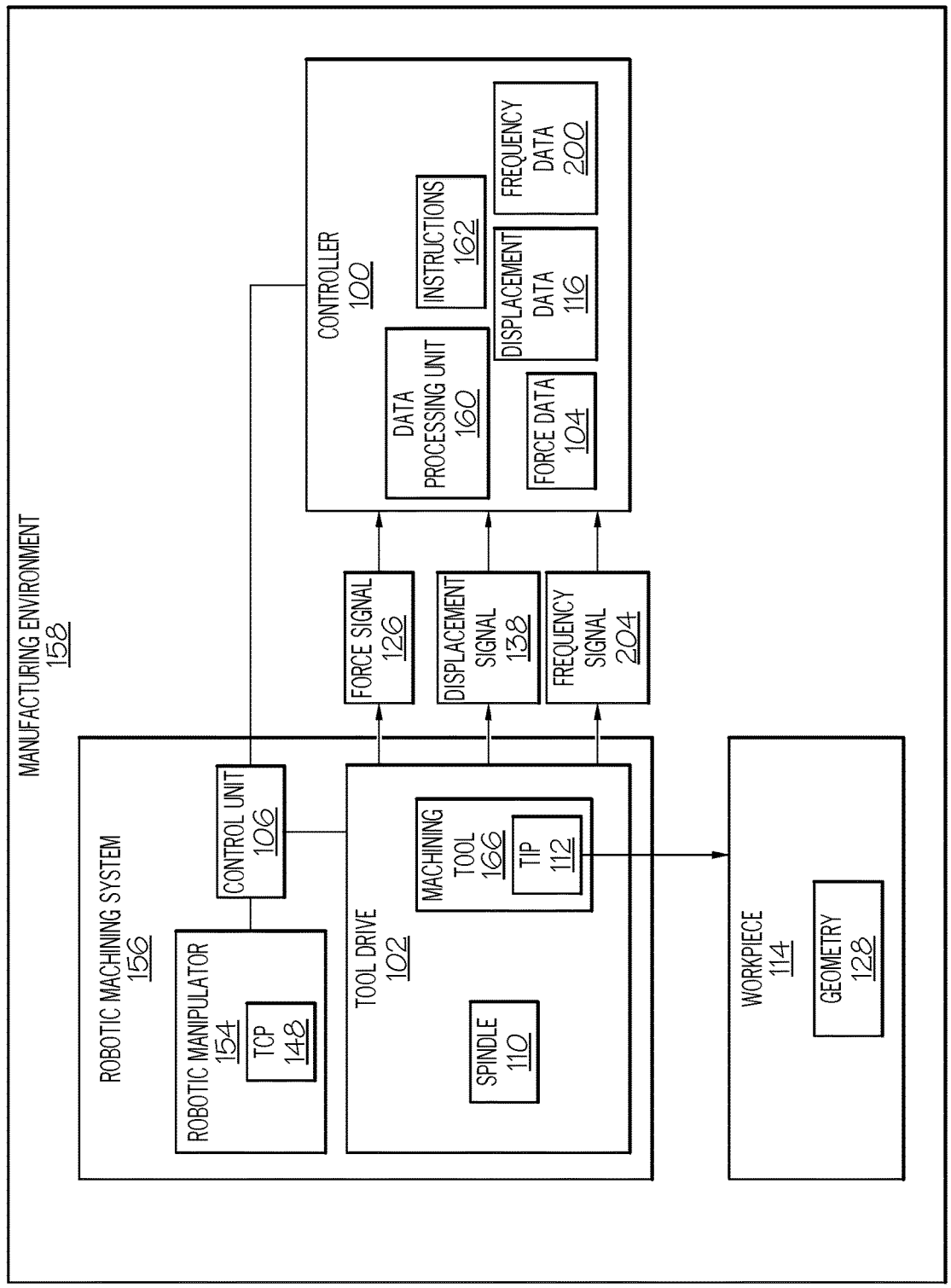
FIG. 1 is a schematic block diagram of an example of a robotic machining system.

Referring generally to FIG. 1, the present disclosure is directed to examples of a controller 100 for use with the tool drive 102 of a robotic machining system 156. The present disclosure is also directed to the robotic machining system 156 that includes the tool drive 102 and that is, at least partially, controlled by the controller 100 in a manufacturing environment 158.

As will be described in more detail herein below, the controller 100 enables the robotic machining system 156 and, more particularly, the tool drive 102 to serve a dual purpose. The robotic machining system 156 and, more particularly, the tool drive 102 serves its primary purpose of performing a machining operation on a workpiece 114. The robotic machining system 156 and, more particularly, the tool drive 102 also serves a secondary purpose of collecting data that is used in the machining operation.

Figure 12:
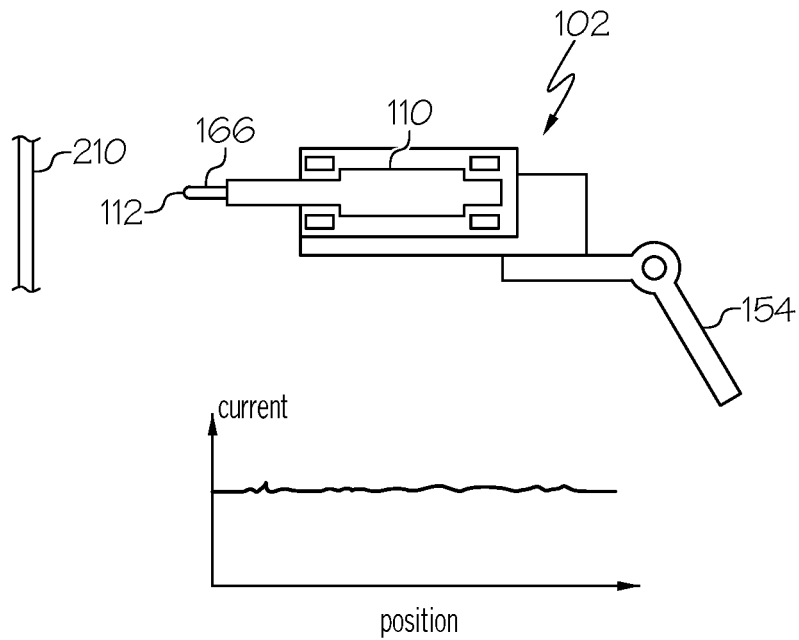
FIG. 12 schematically illustrates an example of the tool drive used as a locating probe prior to contact with a measuring structure.
Figure 13:
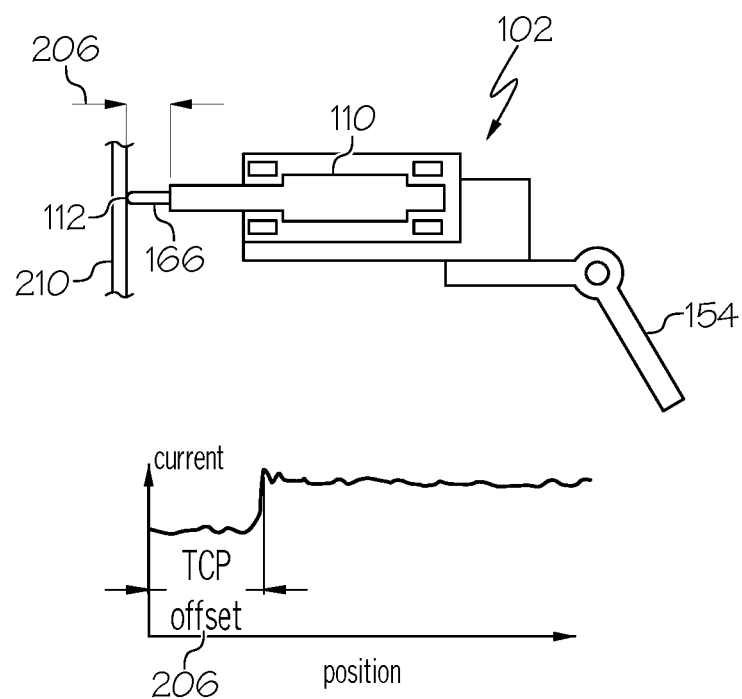
FIG. 13 schematically illustrates an example of the tool drive used as the locating probe after contact with the measuring structure.
Figure 14:
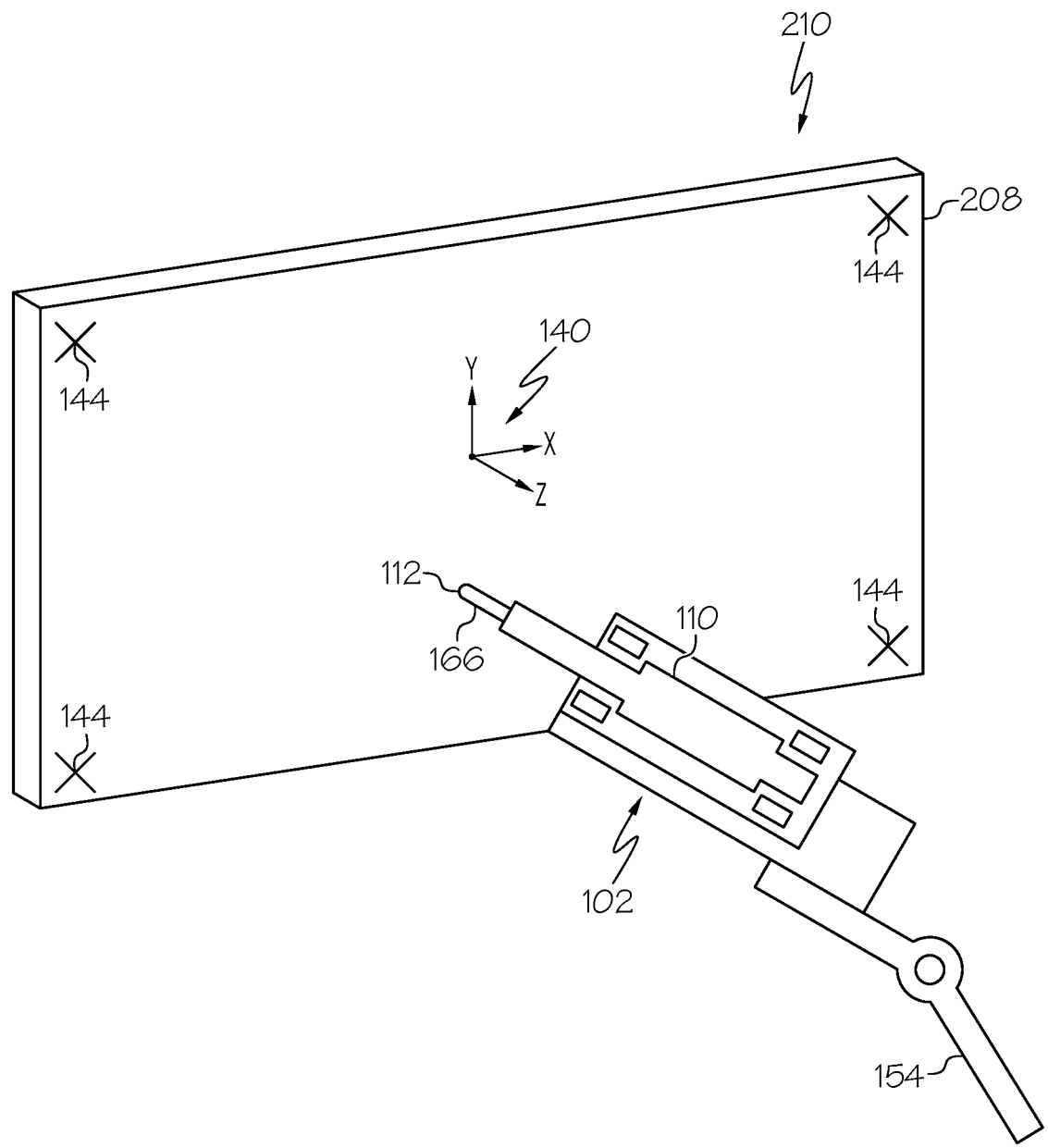
FIG. 14 schematically illustrates an example of the tool drive used to determine a tool center point of a robotic manipulator of the robotic machining system.

The collected data can be used for various purposes. In one or more examples, as best illustrated in FIGS. 5-11, the collected data is used to modify one or more process parameters of the machining operation to compensate for deflection and/or vibration in the workpiece 114 that occur during the machining operation. In one or more examples, as best illustrated in FIGS. 12-14, the collected data is used to locate a tip 112 of the tool drive 102 and, thus, a compensated tool center point (TCP) of the robotic machining system 156. In one or more examples, as best illustrated in FIGS. 12, 13, 15 and 16, the collected data is used to locate the workpiece 114 or one or more features on the workpiece 114.

Figure 2:
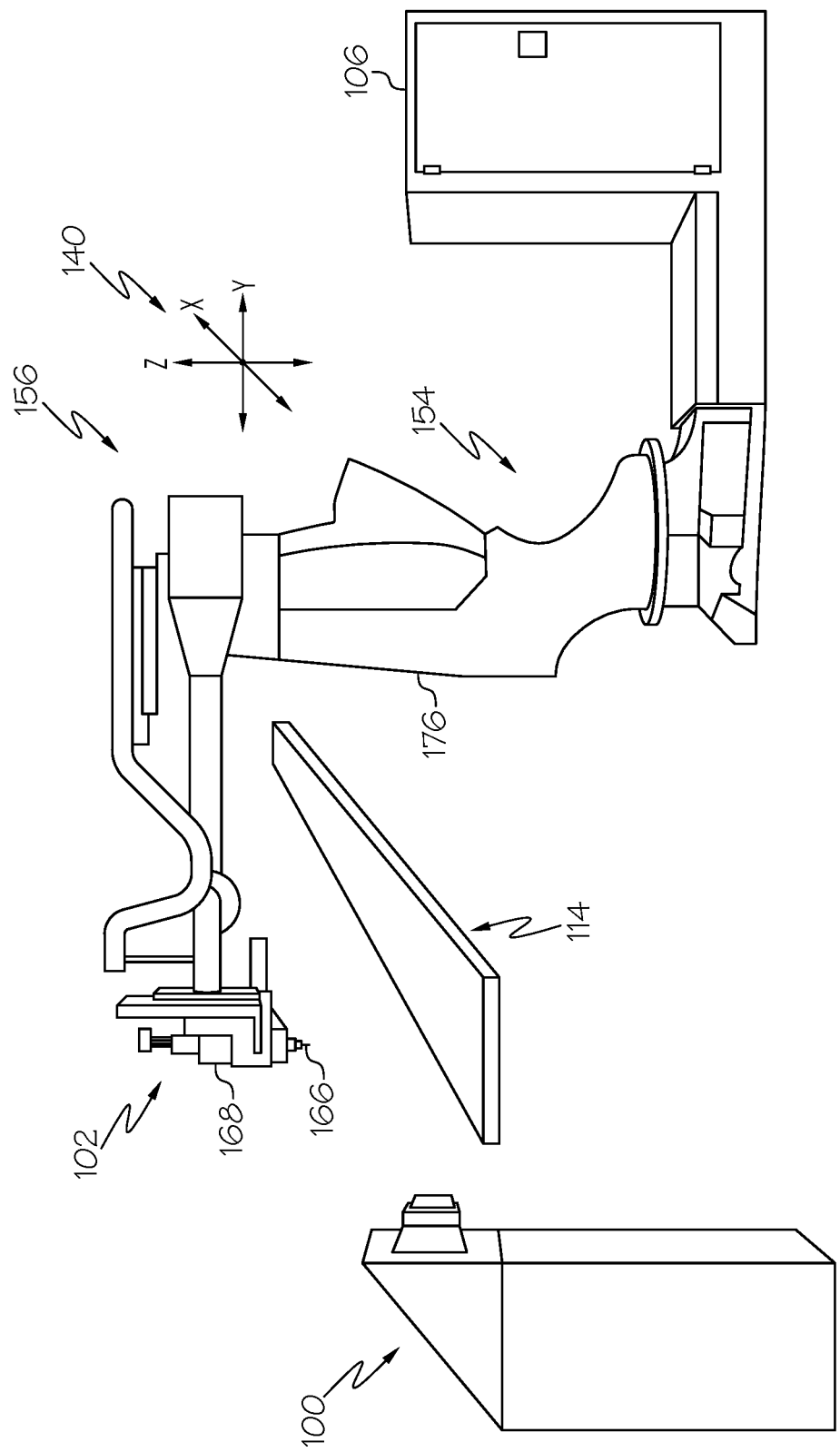
FIG. 2 is a schematic illustration of an example of the robotic machining system.

Referring now to FIG. 2, which schematically illustrates an example of the robotic machining system 156. The robotic machining system 156 is used to perform one or more automated machining operations on a workpiece 114. Examples of the machining operation include, but are not limited to, drilling, routing, milling, grinding, cutting, and the like.

In one particular example, the robotic machining system 156 is a vibration assisted drilling (VAD) system and the corresponding machining operation is a vibration assisted drilling (VAD) operation. Vibration assisted drilling is a machining operation that is used to control drilling debris size and lower drilling temperatures. Various examples of vibration assisted drilling systems utilize a drive mechanism 168 (e.g., servo motor, piezoelectric actuator, electromagnetic actuator, electromagnetic bearings, etc.) to provide drill feed motion, oscillation motion, and rotational motion.

The robotic machining system 156 includes a robotic manipulator 154. In one or more examples, the robotic manipulator 154 includes or takes the form of any suitable electronically controlled machine, such as a multiple degree of freedom (DOF) robotic arm 176 (e.g., as shown in FIG. 2). In one or more examples, the robotic manipulator 154 includes an assembly of movable links and joints. The links are defined as rigid sections that make up the mechanism and the joints are defined as the connection between two links.

The robotic machining system 156 also includes the tool drive 102. The tool drive 102 is coupled to a working end of the robotic manipulator 154. The tool drive 102 interacts with the workpiece 114 and can also be referred to as an end-effector. The tool drive 102 is configured to perform at least one machining or other manufacturing operation on the workpiece 114.

In one or more examples, the tool drive 102 includes the drive mechanism 168 and the machining tool 166. The machining tool 166 is coupled to the drive mechanism 168. The machining tool 166 performs the machining operation. The drive mechanism 168 operates and/or drives motion of the machining tool 166 (e.g., rotation and/or oscillation). An example of the machining tool 166 is a tool bit (e.g., drill bit, cutting bit, grinding bit, routing bit, etc.).

The robotic machining system 156 also includes a control unit 106. Generally, the control unit 106 is a computing device that includes at least one processor unit coupled to at least one storage device (e.g., memory), which includes program code (e.g., computer-readable instructions) that is executable by the processor unit to control movement of the robotic manipulator 154 and/or to control operation of the tool drive 102.

Figure 3:
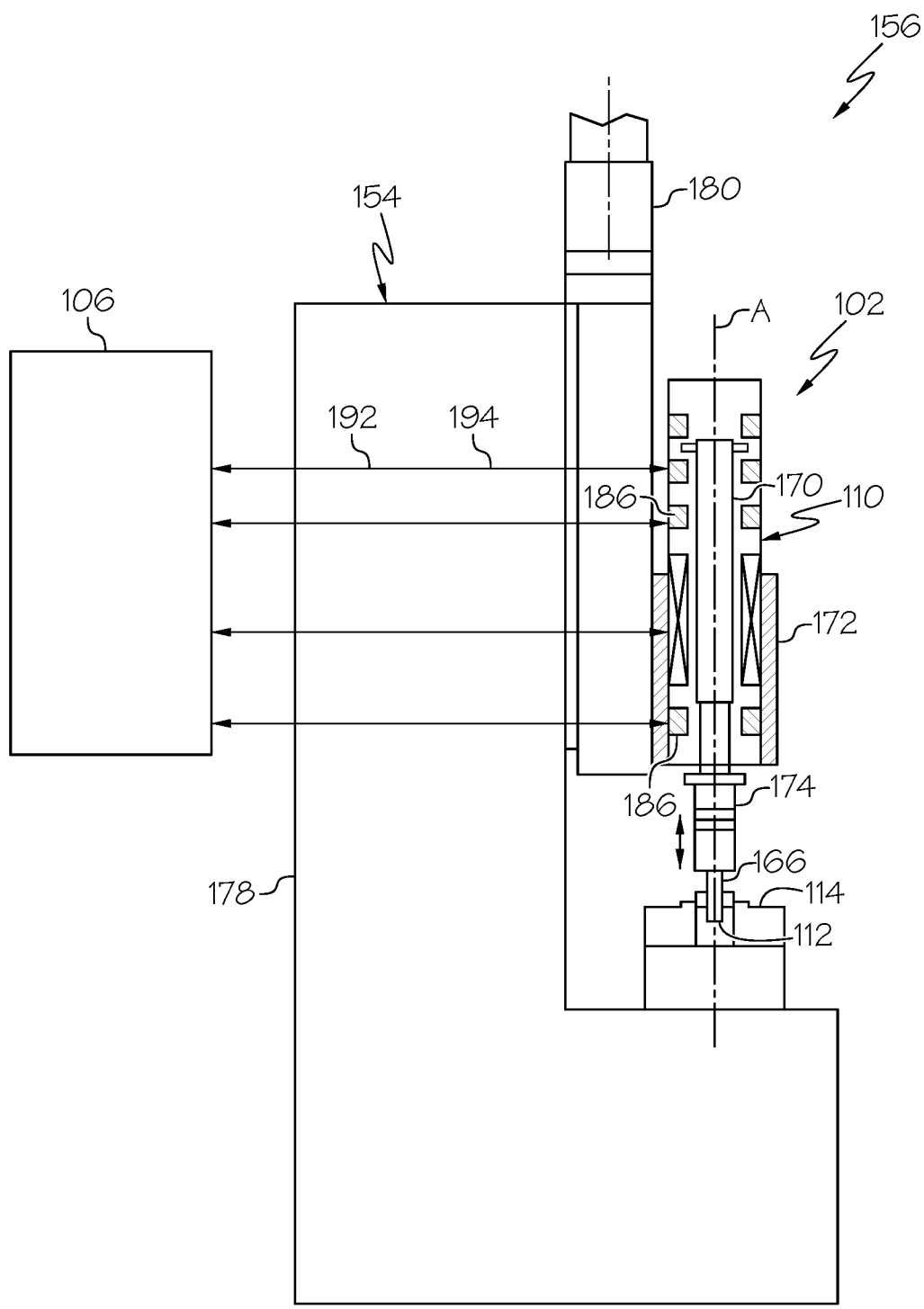
FIG. 3 is a schematic illustration of an example of a tool drive.
Figure 4:
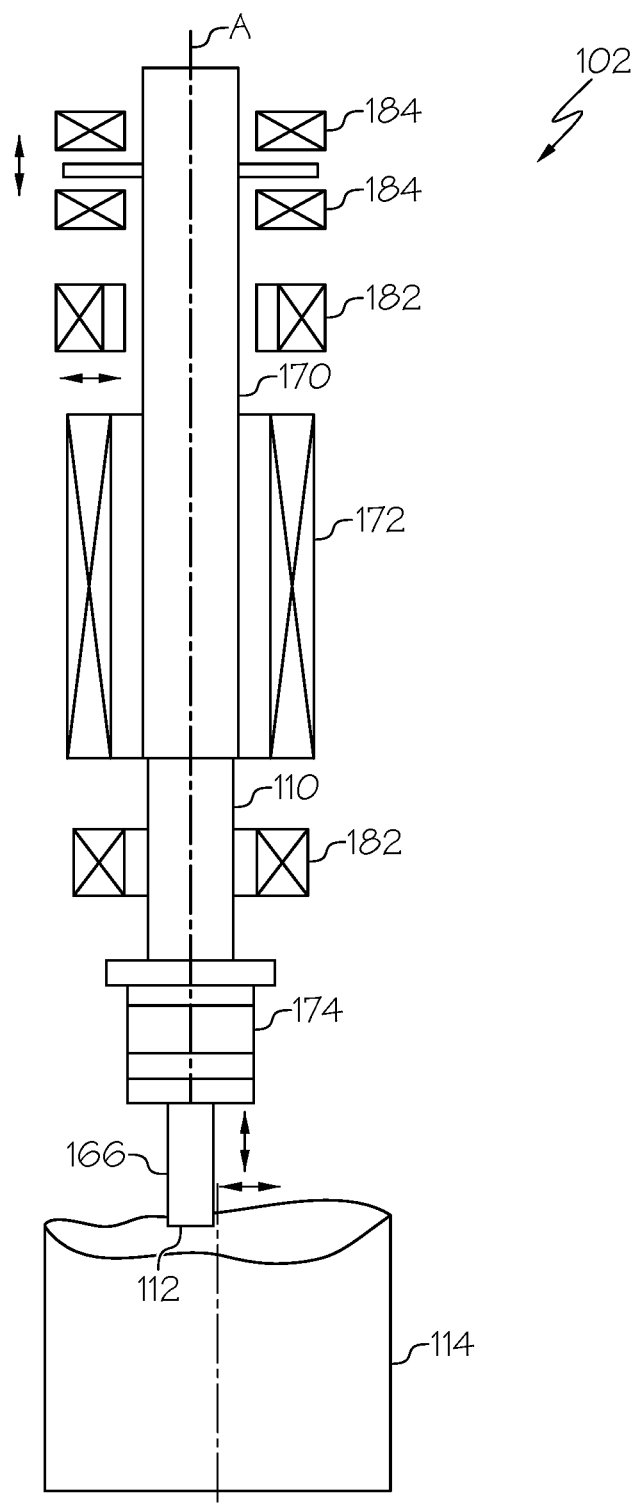
FIG. 4 is a schematic illustration of an example of a portion of the tool drive.

Referring now to FIG. 3, which schematically illustrates another example of the robotic machining system 156 and to FIG. 4, which schematically illustrates an example of a portion of the tool drive 102. In one or more examples, the tool drive 102 includes a spindle 110. The spindle 110 includes a spindle shaft 170 that is driven to rotate by a spindle drive 172. The spindle 110 is an example of the drive mechanism 168 (e.g., shown in FIG. 2). The machining tool 166 (e.g., a tool bit) is coupled to the spindle shaft 170, for example, by a tool holder 174. The machining tool 166 rotates about a spindle axis A (e.g., a tool axis).

As shown in FIG. 3, in one or more examples, the robotic manipulator 154 includes a machine frame 178 and a feed drive 180. The feed drive 180 is coupled to the machine frame 178. In these examples, the tool drive 102 is coupled to the feed drive 180. The feed drive 180 controls motion of (e.g., advances and retracts) the tool drive 102 relative to the workpiece 114.

As shown in FIG. 4, in one or more examples, the spindle shaft 170 is mounted in the tool drive 102 by at least two radial bearings 182 and at least one axial bearing 184, for example, in one or more axial directions. The radial bearings 182 and the axial bearing 184 hold the spindle shaft 170 in position and enable control of small shifts of the spindle shaft 170.

In one or more examples, the axial bearing 184 includes two annular coil magnets that are arranged in opposition to an anchor, which is arranged non-rotatably about the spindle shaft 170, to enable a shift of the spindle shaft 170 in an axial direction. In one or more examples, the radial bearings 182 include upper and lower radial bearings, or rear and front radial bearings.

In one or more examples, the spindle drive 172 is arranged between the radial bearings 182 to enable a shift of the spindle shaft 170 in radial directions. In one or more examples, the spindle drive 172 includes or takes the form of a motor and, for example, may be referred to as a spindle motor. In one or more examples, the spindle motor is a synchronous motor.

In one or more examples, the radial bearings 182 and the axial bearing 184 are magnetic bearings. The bearing parts of the magnetic bearings are held without contact, with an air gap, by magnetic forces. The magnetic forces are generated and adjusted by electromagnets. This allows the spindle shaft 170 to be moved within certain limits and to be adjusted in the radial direction relative to the radial bearings 182 and in the axial direction relative to the axial bearing 184.

Referring again to FIG. 3, in one or more examples, the control unit 106 is coupled to (e.g., is in electronic communication with) the radial bearings 182, the axial bearing 184, and the spindle drive 172. In one or more examples, the control unit 106 includes a plurality of regulation modules or processors that control and/or selectively adjust radial displacement, axial displacement, and rotation of the spindle shaft 170. In one or more examples, the control unit 106 generates and/or provides control signals 194 to the radial bearings 182, the axial bearing 184, and the spindle drive 172 for operation of the tool drive 102 according to predetermined process parameters.

In one or more examples, the tool drive 102 also includes a plurality of sensors 186. The sensors 186 are configured to measure displacements and forces of the spindle 110. As examples, the sensors 186 measure current in magnetic coils or piezoelectric voltage. Sensor signals 192 (e.g., position signals and/or force signals) provided by the sensors 186 are generated and acquired by the spindle 110. The sensor signals 192 are provided to and used by the control unit 106 for the control of the tool drive 102.

In one or more examples, each one of the sensors 186 is assigned to a corresponding one of the radial bearings 182 and the axial bearings 184. In one or more examples, the sensors 186 include measuring transducers. In one or more examples, the measuring transducer is integrated into the magnetic bearing of the radial bearings 182 and the axial bearings 184. In one or more examples, the sensors 186 include Eddy current position sensors.

In one or more examples, the control unit 106 controls the axial bearings 184 and the radial bearings 182 in such a way that vibration movements in an axial direction and in a radial direction (e.g., as shown by directional arrows in FIG. 4) can be actively applied in a controlled manner with adjustable frequency and amplitude.

In one or more examples, movement and adjustment of the spindle shaft 170 in the axial direction and/or the radial direction is achieved through selective control of a magnetic gap within the axial bearings 184 and the radial bearings 182 and modulation of an adjustable vibration movement. Accordingly, the machining tool 166 is freely and fully automatically positionable within certain limits axially and radially by means of the spindle 110 with assistance of the radial bearings 182 (e.g., magnetic radial bearings) and the axial bearings 184 (e.g., magnetic axial bearings).

In one or more examples, the control unit 106 receives current values or voltage values measured in the radial bearings 182 and the axial bearings 184 by the sensors 186 (e.g., sensor signals 192) and converts the values into force values and displacement values. The force values and the displacement values are used by the controller 100 to provide a combined force-displacement control and regulation during the machining operation in which movement of the spindle shaft 170 can be adjusted based on currently present machining conditions.

Examples of the tool drive 102, or the spindle 110, including the magnetic-bearing spindle or piezoelectric spindles, for example, as described above, may also be referred to as "smart spindle" tool drives. An example of the spindle 110 is a magnetic-bearing spindle commercially available from KEBA® Industrial Automation GmbH of Linz, Austria. Another example of the spindle 110 is a smart spindle commercially available from WEISS Spindeltechnologie GmbH of Maroldsweisach, Germany. Various other types of magnetic-bearing spindles are also contemplated.

Referring generally to FIGS. 5-11, in one or more examples, the controller 100 collects data or information related to force and displacement (e.g., force values and displacement values) from the tool drive 102 (e.g., from the control unit 106). The controller 100 uses the force data and the displacement data (e.g., collected from the tool drive 102) to determine stiffness, deflection, and vibration properties of the workpiece 114. The controller 100 uses force values and displacement values (e.g., collected from the tool drive 102) to adjust the operating conditions or process parameters of the tool drive 102 based on the determined stiffness and vibration properties of the workpiece 114 to accommodate or account for deflections and vibrations in the workpiece 114 during the machining operation.

Figure 5:
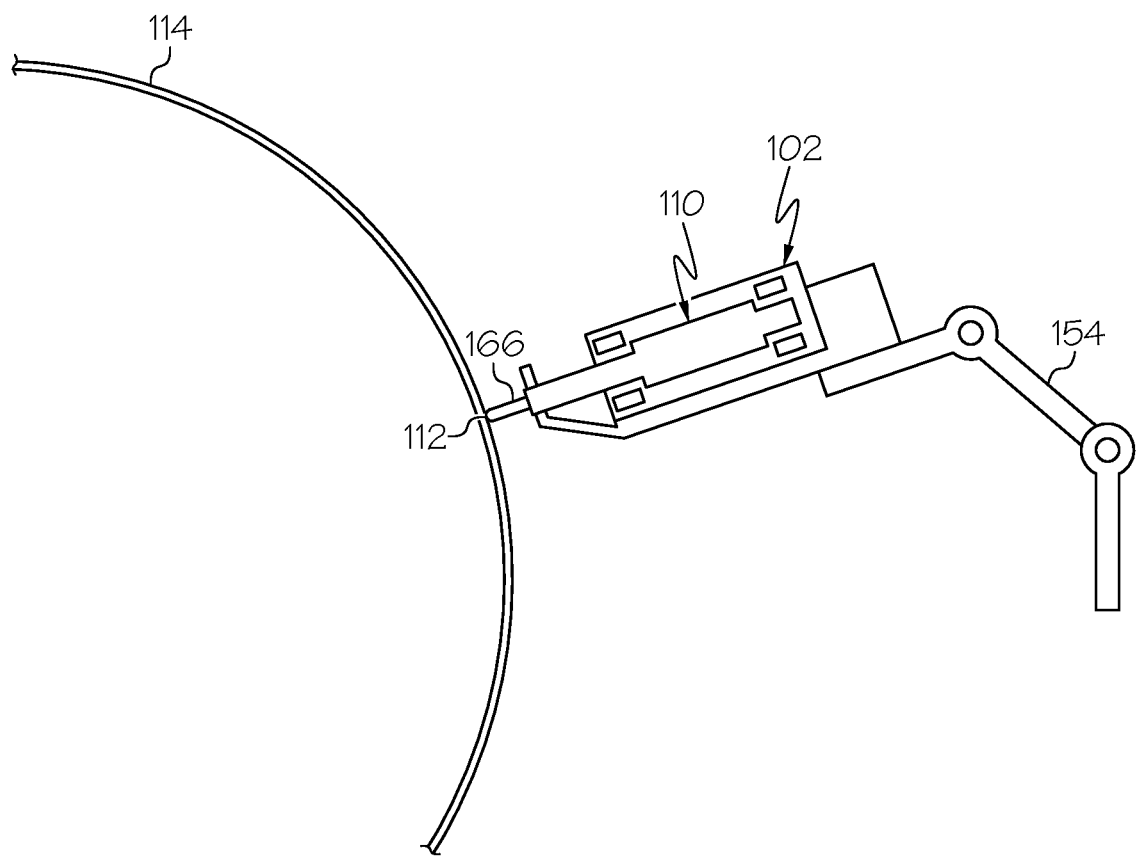
FIG. 5 is a schematic illustration of an example of a workpiece and the tool drive.

Referring now to FIG. 5, which schematically illustrates an example of a portion of the workpiece 114 and an example of the tool drive 102. During a machining operation, certain types of the workpiece 114, such as large aerospace structures, may be subject to deflections and vibrations. Deflection and vibration in the workpiece 114 can be a root cause of many quality issues in the machining operation.

In one or more examples, inaccurate machining can result from chatter in the workpiece 114. Chatter can be caused by vibrations and the interaction of work-piece dynamics and spindle dynamics (e.g., axial movement, radial movement, and rotational movement of the spindle 110). Excitation sources include tool rotation, process forces, and defined tool vibrations (e.g., from vibration assisted drilling). In one or more examples, inaccurate machining can result from deflections in the workpiece 114. As an example, the workpiece 114 can bend in a direction away from the tool under process loads. In one or more examples, kinematic deterioration of a vibration assisted drilling process includes quasi-static deflections of the workpiece 114 that occur due to the axial cutting force. As a result, an actual cutting amplitude is smaller than expected and the amplitude is not sufficient for chip breaking, which can cause a decline in machining quality.

The present disclosure is directed to apparatuses and methods for using spindles with actuation capabilities (e.g., the spindle 110) to address the above-referenced problems. The spindle 110 (e.g., piezoelectric spindle or electromagnetic spindle) enables selective positioning of the spindle shaft 170 along at least one axis. The spindle 110 includes the sensors 186 that measure displacement (e.g., directly) and forces (e.g., indirectly). The sensor signals 192 (e.g., shown in FIG. 3) provided by the sensors 186 are used to identify a stiffness of the workpiece 114 and to adapt the machining process such that quality issues associated with deflection and vibration are avoided. By applying appropriate forces and deflections on the workpiece 114, the stiffness of the workpiece 114 is calculated from a structural response measured by spindle positions (e.g., displacements) and/or spindle force measurements. Based on the computed stiffness, machining process parameters can be adapted, and process control measures can be triggered.

Accordingly, the controller 100 enables mechanical properties of the workpiece 114 to be measured using the spindle 110. The sensor signals 192 from the sensors 186 (e.g., position signals and force signals) are used to represent or quantify deflection of the workpiece 114 and force on the workpiece 114. A relationship between deflection and force defines the stiffness (e.g., static stiffness and dynamins stiffness) of the workpiece 114. The controller 100 also enables adjustment, adaption, and modification of process parameters and process controls according to the mechanical properties determined for the workpiece 114.

Figure 6:
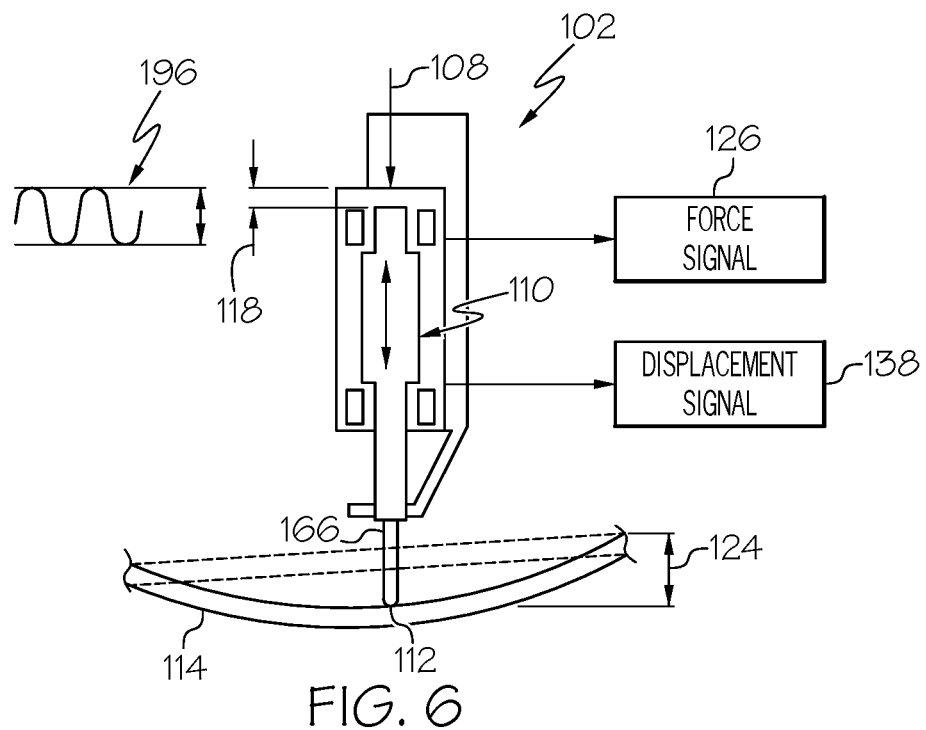
FIG. 6 is a schematic illustration of an example of the tool drive depicted during a stiffness identification phase of a machining operation.
Figure 9:
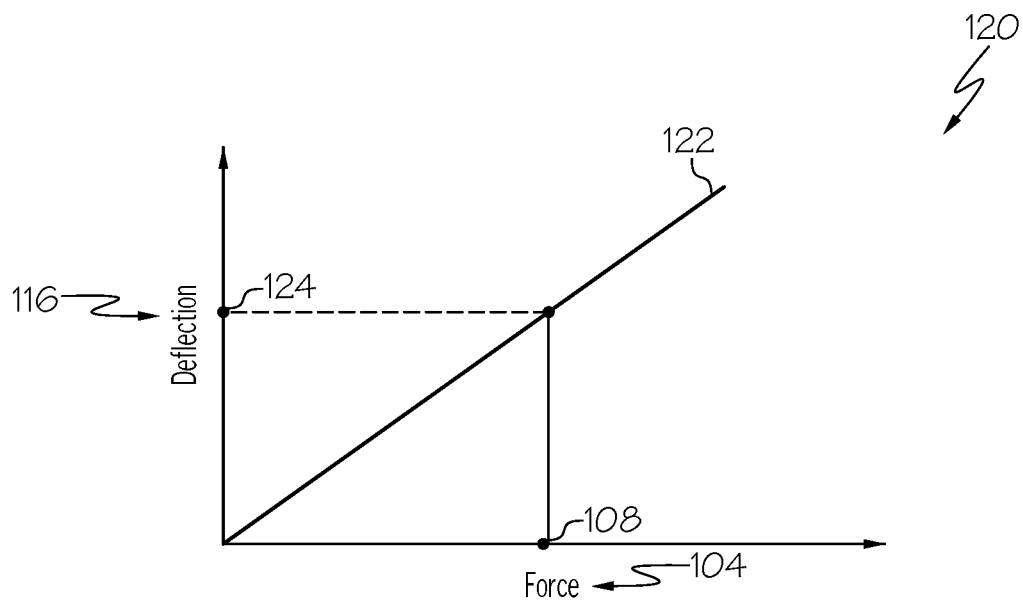
FIG. 9 illustrates an example of a displacement compensation derived from the static stiffness model and used to compensate tool motion of the tool drive shown in FIG. 8.
Figure 19:
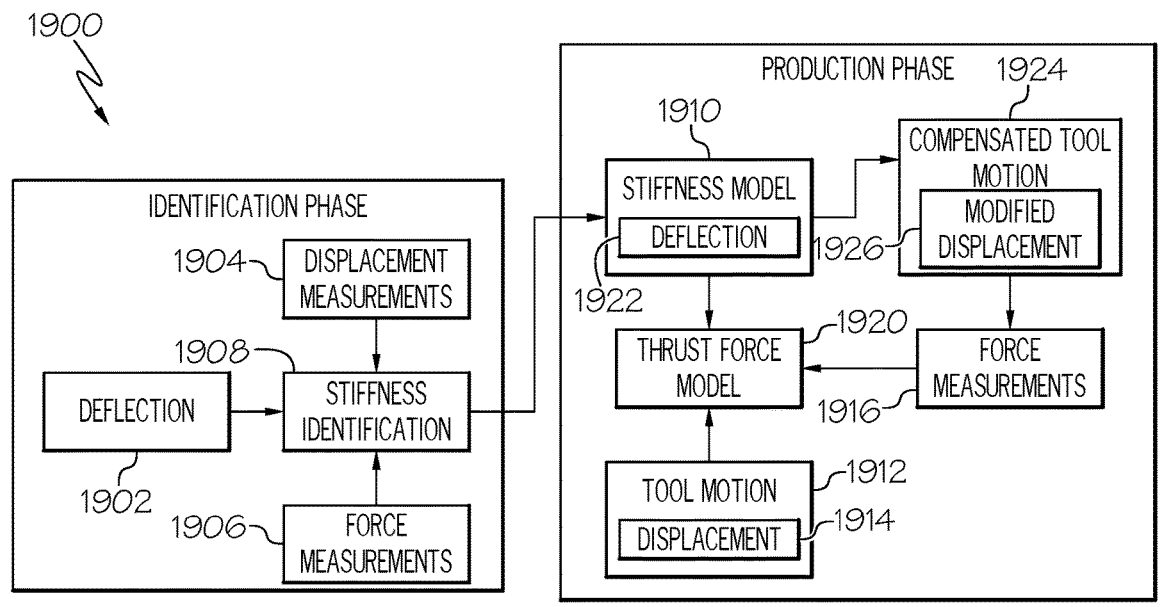
FIG. 19 is a block diagram of an example of a static stiffness identification and compensation process.
Figure 20:
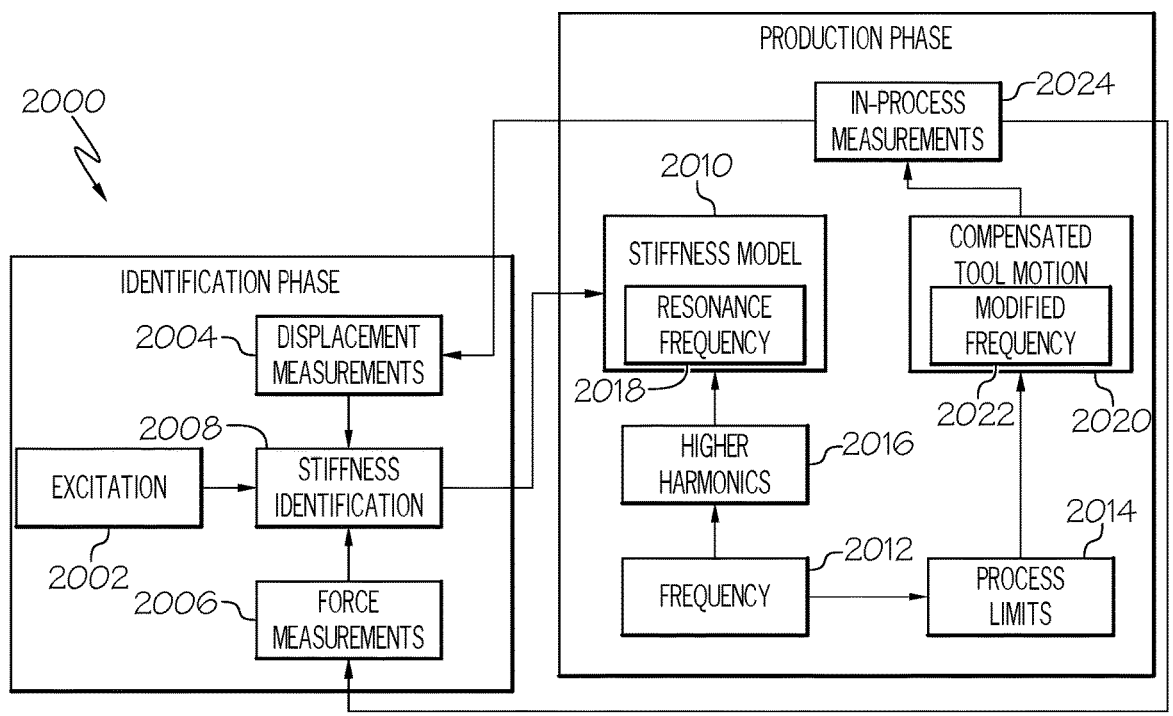
FIG. 20 is a block diagram of an example of a dynamic stiffness identification and compensation process.

Referring now to FIGS. 6, 19 and 20, which schematically illustrate examples of an identification phase (e.g., shown in FIGS. 19 and 20) of the machining operation in which the tool drive 102 (e.g., shown in FIG. 6) is used as an initial data collection sensor for determining the stiffness properties of the workpiece 114. The example illustrated in FIG. 6 shows an example of a process for identifying a static stiffness of the workpiece 114 (e.g., as shown in FIG. 19) or a dynamic stiffness of the workpiece 114 (e.g., as shown in FIG. 20). In these examples, the workpiece 114 is purposefully deflected (e.g., as shown in FIG. 19) or excited (e.g., as shown in FIG. 20) during the collection of data to be used to define the static stiffness (e.g., as shown in FIGS. 9 and 19) and/or the dynamic stiffness (e.g., as shown in FIGS. 11 and 20) of the workpiece 114.

Referring to FIG. 6, in one or more examples, deflection or excitation of the workpiece 114 is performed using the tool drive 102. As an example, motion 196 of the spindle 110 is applied to the workpiece 114. In one or more examples, the motion 196 is quasi-static motion (e.g., deflection), such as for the static stiffness identification. In one or more examples, the motion 196 is excitation motion, for example, that mimics process-based excitation of the workpiece 114 that occurs during the machining operation, such as for the dynamic stiffness identification.

In one or more examples, the spindle 110 (e.g., the spindle shaft 170 shown in FIGS. 3 and 4) is preloaded to ensure contact between a tip 112 of the machining tool 166 and a surface of the workpiece 114 during data collection and motion 196 of the spindle 110.

In one or more examples, the motion 196 (e.g., deflection and/or excitation) of the workpiece 114 is performed by contact of the machining tool 166 with a surface of the workpiece 114 using the spindle 110 of the tool drive 102 (e.g., as shown in FIG. 6). For example, the spindle shaft 170 is moved (e.g., oscillated), for example, using the electromagnetic bearings (e.g., the radial bearings 182 and/or the axial bearing 184 shown in FIG. 3) or piezoelectric actuators of the spindle 110. In these examples, a protective nib or cover can be coupled to the tip 112 of the machining tool 166 to protect the surface of the workpiece 114 from damage during the static stiffness identification process.

In other examples (not shown), the machining tool 166 is a dedicated contact device used for inducing the motion 196 (e.g., deflection or excitation) of the workpiece 114, such as rollers, spherical feeler probes, and other suitable contact or probe devices. In these examples, the contact device is coupled to the spindle 110 by the tool holder 174 (e.g., using an automatic tool changer).

In one or more examples, the excitation signal has the form of a sweep, white noise, step signal, impact signal, or in process noise. The response measurement is performed using the internal displacement of the spindle 110 and the sensors 186 (e.g., current or voltage sensors). In one or more examples, forces and workpiece deflections can be computed using a model. Compensation of dynamic effects may be necessary.

Referring again to FIG. 1, in one or more examples, the controller 100 includes a data processing unit 160 and instructions 162 that are executable to collect force data 104 from the control unit 106 of the tool drive 102. The force data 104 is representative of a force 108 (e.g., shown in FIG. 6) applied to the spindle 110 of the tool drive 102 in response to engagement of a tip 112 of the tool drive 102 with the workpiece 114. Collection of the force data 104 enables the tool drive 102 to serve as a sensor for detecting or determining a force applied to the workpiece 114. As used herein, general reference to the force 108 applied to the spindle 110 refers more particularly to the force 108 applied to the spindle shaft 170.

In one or more examples, the force data 104 includes values (e.g., current or voltage values) represented by the sensor signals 192 (e.g., a collection of force signals 126) generated by the sensors 186 of the tool drive 102. In one or more examples, the force 108 refers to a force applied to the spindle shaft 170 (e.g., as shown in FIGS. 3 and 4) of the spindle 110 for positioning or moving the spindle shaft 170 along at least one axis.

For the purpose of the present disclosure, the tip 112 of the tool drive 102 generally refers to an end of the tool drive 102 or an end of the spindle 110 that interacts with the environment (e.g., the workpiece 114). As an example, the tip 112 refers to a tip or end of the machining tool 166, which is coupled to the spindle 110 for the purpose of collecting data and/or performing the machining operation. As another example, the tip 112 refers to a tip or end of the machining tool 166 taking the form of the dedicated probing tool, which is coupled to the spindle 110 for the purpose of probing the workpiece 114 and collecting data.

In one or more examples, the controller 100 includes the instructions 162 that are executable to collect displacement data 116 from the control unit 106 of the tool drive 102. The displacement data 116 is representative of a displacement 118 (e.g., as shown in FIG. 6) of the spindle 110 of the tool drive 102 in response to engagement of the tip 112 of the tool drive 102 with the workpiece 114. Collection of the displacement data 116 enables the tool drive 102 to serve as a sensor for detecting or determining a deflection 124 of the workpiece 114 in response to an applied force. As used herein, general reference to the displacement 118 of the spindle 110 refers more particularly to the displacement 118 of the spindle shaft 170.

In one or more examples, the displacement data 116 includes values (e.g., current or voltage values) represented by the sensor signals 192 (e.g., a collection of displacement signals 138) generated by the sensors 186 of the tool drive 102. In one or more examples, the displacement 118 refers to a linear movement distance or a change in position of the spindle shaft 170 (e.g., as shown in FIGS. 3 and 4) of the spindle 110 when positioning or moving the spindle shaft 170 along at least one axis.

Figure 7:
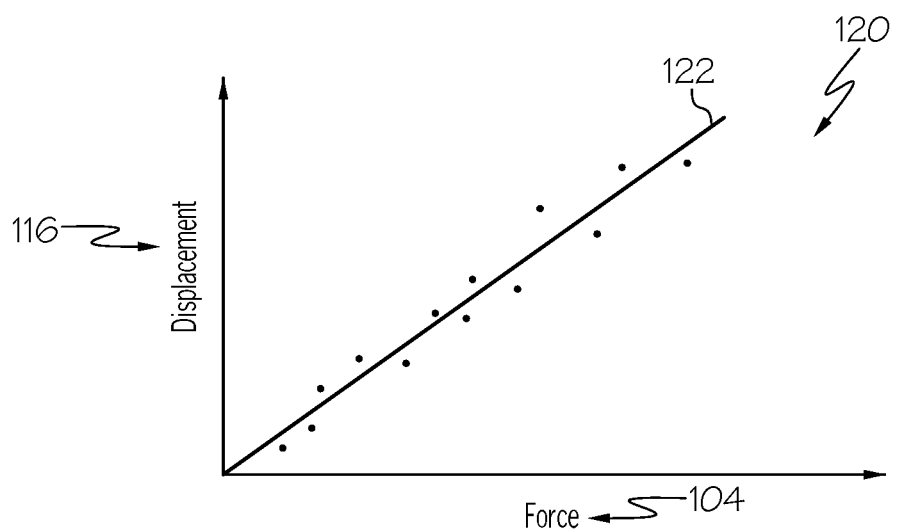
FIG. 7 illustrates an example of a static stiffness model for the workpiece derived from data generated by the tool drive shown in FIG. 6.
Figure 8:
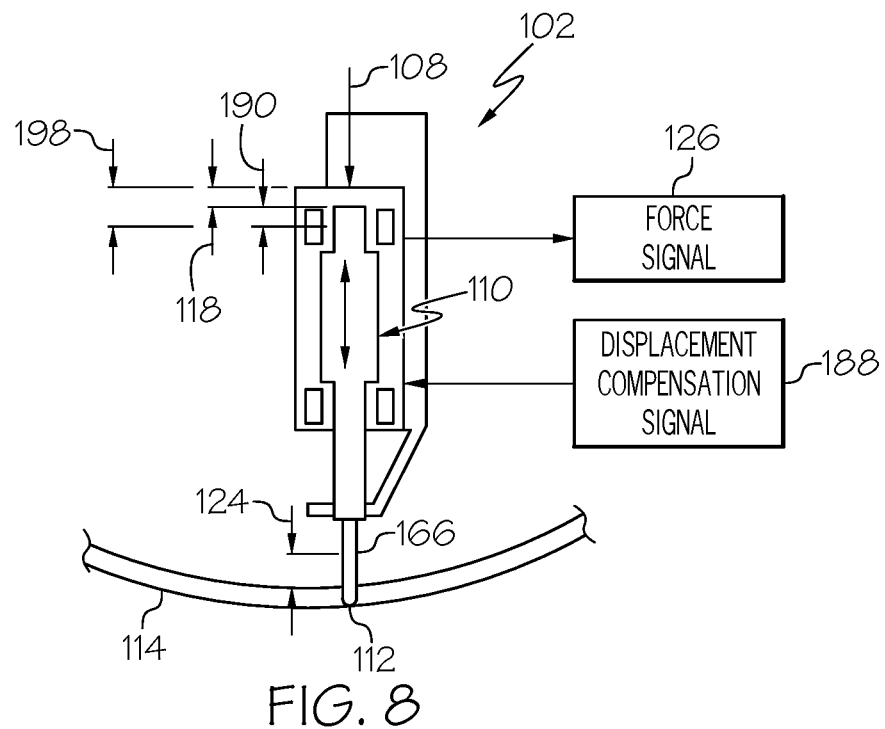
FIG. 8 is a schematic illustration of an example of the tool drive depicted during a production phase of the machining operation.

In one or more examples, as illustrated in FIGS. 7-9, the collected data is used for identification of a static stiffness of the workpiece 114 and in-process compensation of deflection of the workpiece 114. FIG. 7 illustrates an example of a static stiffness model 122 generated from the force data 104 and the displacement data 116. FIG. 8 schematically illustrates compensation of the tool drive 102 during the machining operation. FIG. 9 illustrates an example of the static stiffness model 122 used to determine the deflection 124 of the workpiece 114 for compensation of the tool drive 102.

Referring now to FIG. 7, which illustrates an example of a graphical representation of the relationship between the force data 104 and the displacement data 116 collected from the tool drive 102 and an example of a stiffness model 120 generated from the force data 104 and the displacement data 116. In one or more examples, the stiffness model 120 is the static stiffness model 122 of the workpiece 114. The static stiffness model 122 relates the force 108 (e.g., as shown in FIG. 6) applied to the spindle 110 of the tool drive 102 to the displacement 118 of the spindle 110. The displacement 118 of the spindle 110 represents or corresponds to the deflection 124 (e.g., as shown in FIG. 6) of the workpiece 114.

In one or more examples, the controller 100 includes the instructions 162 that are executable to generate the stiffness model 120 (e.g., the static stiffness model 122) that is representative of the workpiece 114 using the force data 104 and the displacement data 116.

In one or more examples, static stiffness measurements can be performed pointwise or along a trajectory. Pointwise measurements include contact at one point and cyclic loading or linear loading (e.g., load displacement curves such as sinewave or periodic signals). Trajectory measurements include constant loading and measuring deflection (e.g., continuously through movement of the tool drive 102) or constant deflection and measuring the load (e.g., continuously through movement of the tool drive 102).

The stiffness information in the static case (e.g., the static stiffness model 122) may be used for adaptation of vibration amplitude and feed amplitude (e.g., for vibration assisted drilling), compensation of structural deflection (e.g., additional advance in positioning based on stiffness curve and process force), operator warnings, error messages, and/or process stops in problematic cases, triggering of additional quality measurements, skip location identification, or use of full retract pecking as a machining process.

In one or more examples, the static stiffness model 122 is mapped to a geometry 128 of the workpiece 114. As an example, the force data 104 and the displacement data 116 are mapped or correlated to different locations (e.g., X, Y, Z-coordinates) on the surface of workpiece 114. In one or more examples, the controller 100 includes the instructions 162 that are executable to map the static stiffness model 122 to the geometry 128 of the workpiece 114.

Referring now to FIGS. 8 and 19, which schematically illustrates an example of a production phase (e.g., as shown in FIG. 19) of the machining operation in which the tool drive 102 is used for machining the workpiece 114 and motion of the tool drive 102 is compensated for the deflection 124 of the workpiece 114 during the machining operation.

In one or more examples, the controller includes the instructions 162 that are executable to collect the force signal 126 from the control unit 106 of the tool drive 102 of the force 108 applied to the spindle 110 of the tool drive 102. In one or more examples, the force signal 126 is collected after the stiffness model 120 (e.g., the static stiffness model 122) is generated from the force data 104 and the displacement data 116. In one or more examples, the force signal 126 is collected during machining of the workpiece 114 (e.g., as shown in FIG. 8). For example, the force signal 126 represents an instantaneous or continual force occurring during machining.

In one or more examples, the controller 100 includes the instructions 162 that are executable to use the force signal 126 (e.g., shown in FIG. 8) and the static stiffness model 122 (e.g., as shown in FIG. 9) to determine the deflection 124 of the workpiece 114 during the machining of the workpiece 114. As an example, shown in FIG. 9, the force 108 is determined (e.g., measured) using the force signal 126 (FIG. 8). The deflection 124 is determined using the static stiffness model 122 that corresponds to the force 108.

In one or more examples, the controller 100 includes the instructions 162 that are executable to use the deflection 124 determined from the static stiffness model 122 for the workpiece 114 to modify the displacement 118 of the spindle 110 and to compensate for the deflection 124 of the workpiece 114 during the machining of the workpiece 114.

In one or more examples, during the machining operation, the displacement 118 of the spindle 110 in the axial direction is a predetermined process parameter provided to the tool drive 102 by the control unit 106. The controller 100 determines (e.g., calculates) a displacement compensation 190 (e.g., shown in FIG. 8) required to account for the deflection 124 of the workpiece 114, determined from the static stiffness model 122 and corresponding to the force 108. The controller 100 is configured to generate and provide a displacement compensation signal 188 (e.g., shown in FIG. 8) to the tool drive 102 (e.g., to the control unit 106). The displacement 118 of the spindle 110 is compensated by the displacement compensation 190 such that a compensated displacement 198 (e.g., shown in FIG. 8) is equal to and accounts for the deflection 124 of the workpiece 114.

The compensated displacement 198 of the spindle 110 compensates for the deflection 124 (e.g., flexibility) of the workpiece 114 and properly locates the tip 112 of the machining tool 166 relative to the workpiece 114 upon the deflection 124 of the workpiece 114. It can be appreciated that, without the displacement compensation 190, the displacement 118 of the spindle 110 would not properly locate the tip 112 of the machining tool 166 relative to the workpiece 114 upon the deflection 124 of the workpiece 114. For example, the tip 112 of the machining tool 166 may not reach the desired location relative to the workpiece 114.

Figure 10:
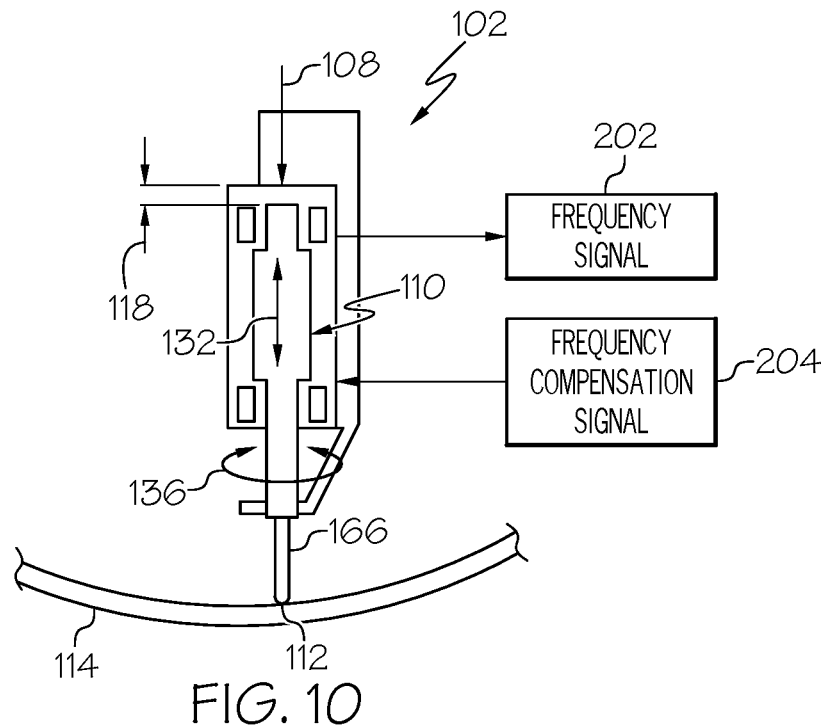
FIG. 10 is a schematic illustration of an example of the tool drive depicted during the production phase of the machining operation.
Figure 11:
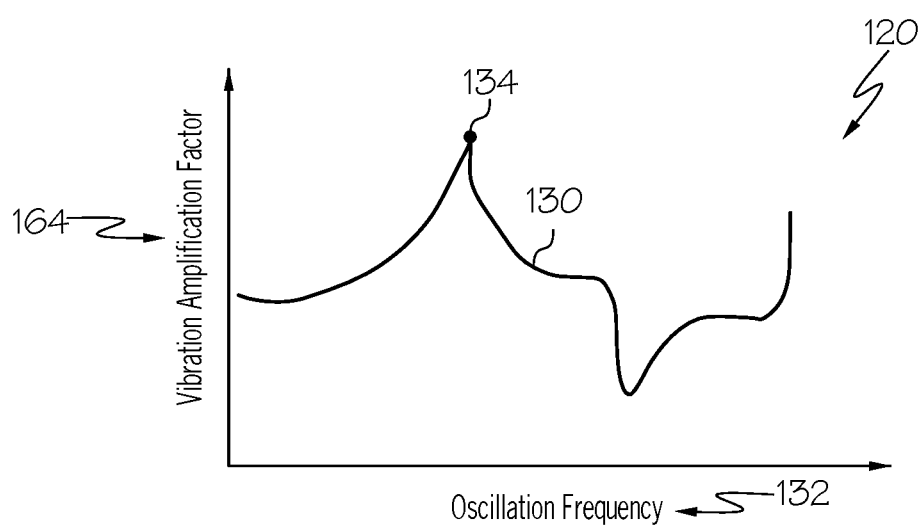
FIG. 11 illustrates an example of a dynamic stiffness model for the workpiece derived from data generated by the tool drive shown in FIG. 6.

In one or more examples, as illustrated in FIGS. 10 and 11, the collected data is used for identification of a dynamic stiffness of the workpiece 114 and in-process compensation of vibration of the workpiece 114. FIG. 10 schematically illustrates compensation of the tool drive 102 during the machining operation. FIG. 11 illustrates an example of a dynamic stiffness model 130 used to determine a resonant frequency 134 of the workpiece 114 for compensation of the tool drive 102.

Referring now to FIG. 11, which illustrates an example of a graphical representation of the relationship between an oscillation frequency 132 of the spindle 110 and a vibration amplification factor 164 and an example of the stiffness model 120 generated from oscillation frequencies 132 and corresponding vibration amplification factors 164. In one or more examples, the stiffness model 120 is the dynamic stiffness model 130. The dynamic stiffness model 130 relates the oscillation frequency 132 of the spindle 110 to the vibration amplification factor 164 of the workpiece 114.

In one or more examples, the dynamic stiffness model 130 is generated by exciting the workpiece 114 in a broad frequency band (e.g., through intentional impact, process noise sine sweep excitations, or white noise excitation with the tool tip/probe tip) and measuring the response directly through the sensors 186 of the spindle 110 or indirectly through other sensor devices, such as laser sensors or acceleration sensors. The oscillation frequency 132 (e.g., the x-axis in FIG. 11) can be any excitations frequency (e.g., oscillations of the tool for chip breaking). If the resonant frequency 134 (e.g., the frequency where the dynamic stiffness model 130 has a peak) coincides with the excitation frequency, the workpiece 114 is resonating and the vibrations are amplified.

In one or more examples, the controller 100 includes the instructions 162 that are executable to generate the stiffness model 120 that is representative of the workpiece 114 using the oscillation frequencies 132 and the vibration amplification factors 164.

The vibration amplification factor 164 is a ratio between response amplitude (e.g., displacement) and excitation amplitude (e.g., force) at a certain frequency. The vibration amplification factor 164 may also referred to as the absolute value of the frequency response function. Any one of various suitable estimation techniques can be used to obtain the frequency response function from available experimental data. Alternatively, the frequency response function can be computed from a model. In one or more examples, values representing the vibration amplification factor 164 are stored, for example, in a lookup table. In one or more examples, values representing the vibration amplification factor 164 are obtained from an analytic model.

In one or more examples, dynamic stiffness measurement can be performed via excitation on discrete points using a sweep, white noise, step or impact signal, or in process noise. The dynamic response is recorded. A driving point transfer function can be computed from the measurements. The transfer functions are specific to the measurement location on the workpiece 114. Resonance frequencies and dynamic system models of the workpiece 114 are identified using modal analysis.

The stiffness information in the dynamic case (e.g., the dynamic stiffness model 130) may be used for adaptation of rotational speed and vibration frequency (e.g., for vibration assisted drilling), operator warnings, error messages, and/or process stops in problematic cases, triggering of additional quality measurements, skip location identification, or use of full retract pecking as a machining process.

In one or more examples, the controller 100 includes the instructions 162 that are executable to determine the resonant frequency 134 (e.g., shown in FIGS. 11 and 20) of the workpiece 114 from the dynamic stiffness model 130. The resonant frequency 134 is determined after the dynamic stiffness model 130 is generated.

In one or more examples, the dynamic stiffness model 130 is mapped to the geometry 128 of the workpiece 114. As an example, the resonant frequency 134 is mapped or correlated to different locations (e.g., X, Y, Z-coordinates) on the surface of workpiece 114. In one or more examples, the controller 100 includes the instructions 162 that are executable to map the dynamic stiffness model 130 to the geometry 128 of the workpiece 114.

Referring now to FIGS. 10 and 20, which schematically illustrates an example of the production phase (e.g., as shown in FIG. 20) of the machining operation in which the tool drive 102 is used for machining the workpiece 114 and the tool drive 102 is compensated for the vibrations of the workpiece 114 during the machining operation.

In one or more examples, the controller includes the instructions 162 that are executable to collect data or information from the control unit 106 of the tool drive 102 of an oscillation frequency 132 and a rotational frequency 136 (e.g., as shown in FIG. 10 and also referred to collectively as frequency data 200 as shown in FIG. 1) of the spindle 110 of the tool drive 102. In one or more examples, the oscillation frequency 132 and the rotational frequency 136 represented by the frequency data 200 are predetermined process parameters provided by the control unit 106.

In one or more examples, a frequency signal 202 representing the present value for the oscillation frequency 132 and the rotational frequency 136 is collected (e.g., by the controller 100 from the control unit 106 of the tool drive 102) after the stiffness model 120 (e.g., the dynamic stiffness model 130) is generated. In one or more examples, the frequency signal 202 (e.g., data representing the oscillation frequency 132 and the rotational frequency 136) is collected during machining of the workpiece 114 (e.g., as shown in FIG. 10). For example, the frequency signal 202 represents an instantaneous or continual oscillation frequency and rotational frequency occurring during machining.

In one or more examples, the controller 100 includes the instructions 162 that are executable to use the resonant frequency 134 determined for the workpiece 114 to modify at least one of the oscillation frequency 132 of the spindle 110 and the rotational frequency 136 of the spindle 110 to reduce vibrations in the workpiece 114 during the machining of the workpiece 114 (e.g., as shown in FIGS. 10 and 20).

In one or more examples, during the machining operation, the oscillation frequency 132 and the rotational frequency 136 a predetermined process parameters provided to the tool drive 102 by the control unit 106. The controller 100 determines (e.g., calculates) a frequency compensation required to account for the vibrations of the workpiece 114, determined from the dynamic stiffness model 130 and corresponding to the resonant frequency 134. The controller 100 is configured to generate and provide a frequency compensation signal 204 (e.g., shown in FIG. 10) to the tool drive 102 (e.g., to the control unit 106). At least one of the oscillation frequency 132 and the rotational frequency 136 of the spindle 110 is compensated by the frequency compensation such that a compensated oscillation frequency and/or compensated rotational frequency do not coincide with the resonant frequency 134 of the workpiece 114.

The modified frequency (e.g., compensated oscillation frequency and/or compensated rotational frequency) of the tool drive 102 being different than the resonant frequency 134 of the workpiece 114 prevents resonance (e.g., increased amplitude) that may occur when the frequency of the force applied by the tool drive 102 is equal or close to a natural frequency of the workpiece 114.

In one or more examples, the stiffness model 120 includes both the static stiffness model 122 (e.g., shown in FIG. 9) and the dynamic stiffness model 130 (e.g., shown in FIG. 11). In one or more examples, the stiffness model 120 and the dynamic stiffness model 130 are mapped to the geometry 128 of the workpiece 114. In one or more examples, the controller 100 includes the instructions 162 that are executable to map the stiffness model 120 (e.g., the stiffness model 120 and the dynamic stiffness model 130) to the geometry 128 of the workpiece 114.

As illustrated in FIGS. 8-11, in one or more examples, after the stiffness model 120 is generated, the instructions 162 are executable to collect the force signal 126 from the control unit 106 of the tool drive 102. The instructions 162 are executable to use the force signal 126 and the stiffness model 120 to determine the deflection 124 of the workpiece 114 and to determine the resonant frequency 134 of the workpiece 114 during the machining of the workpiece 114. The instructions 162 are executable to use the deflection 124 and the resonant frequency 134 determined for the workpiece 114 to modify at least one of the displacement 118 of the spindle 110, the oscillation frequency 132 of the spindle 110, and the rotational frequency 136 of the spindle 110 during the machining of the workpiece 114.

Referring generally to FIGS. 12-16, in one or more examples, the controller 100 collects data or information related to force and displacement (e.g., force values and displacement values) from the tool drive 102 (e.g., from the control unit 106). In one or more examples, the controller 100 uses the force data and the displacement data (e.g., collected from the tool drive 102) to determine a location of a tool center point (TCP) 148 (e.g., shown in FIG. 1) of the robotic machining system 156, for example, prior to or during the machining operation. In one or more examples, the controller 100 uses the force data and the displacement data (e.g., collected from the tool drive 102) to determine a location and orientation of the workpiece 114, for example, prior to or during the machining operation.

In automated manufacturing, the robotic machining system 156 performs the machining operation with very high accuracy due to the control unit 106 keeping track of where all the robotic assembly parts are in relation to others in every moment. To do so, the robotic machining system 156 uses a coordinate system fixed to the robotic manipulator 154. Generally, without a tool attached to the robotic manipulator 154, an end of the robotic manipulator 154 (e.g., robotic arm) is used as the reference point for navigation. When a tool (e.g., the tool drive 102) is coupled to the end of the robotic manipulator 154, the reference point needs to change to account for the offset of the tool. A tool center point (TCP) is used to create the necessary adjustment to translate the coordinate system to keep track of the tool instead of the end of the robotic manipulator 154. Another important factor in automated manufacturing is the position (e.g., location and orientation) of the workpiece 114. Deviations between an actual position and a nominal position of the workpiece 114 may lead to inaccuracies, manufacturing quality issues, or damage the system or the robot.

Accordingly, prior to and/or during the machining operation, accurate knowledge of the location of the tool center point of the robotic machining system 156 is required. Additionally, the location of the tool center point of the robotic machining system 156 may need to be recalibrated as needed, such as due to development of slack in the joints of the robotic manipulator 154 over time, due to new tool geometry, and the like. Furthermore, accurate knowledge of an actual location and orientation of the workpiece 114 is required. Such knowledge also enables corrections for any deviation between the actual position (e.g., actual location and orientation) of the workpiece 114 and a nominal position (e.g., theoretical location and orientation) of the workpiece 114 (e.g., where the control unit 106 of the robotic machining system 156 thinks the workpiece 114 is).

The present disclosure is also directed to apparatuses and methods for using spindles with actuation capabilities (e.g., the spindle 110) to address the above-referenced problems. The spindle 110 (e.g., piezoelectric spindle or electromagnetic spindle) enables selective positioning of the spindle shaft 170 along at least one axis. The spindle 110 includes the sensors 186 that measure displacement (e.g., directly) and forces (e.g., indirectly). The sensor signals 192 (e.g., shown in FIG. 3) provided by the sensors 186 are used to determine the location of the tool center point, compensated for tool offset, and to determine the position of the workpiece 114 without a need for external equipment or complex setup.

Accordingly, the controller 100 enables the tool drive 102 to serve as a probe and uses the signals provided by the sensors 186 of the tool drive 102 as measurements from the spindle 110 while the tool drive 102 is in operation. This implementation of the controller 100 and utilization of the spindle 110 substitutes for the use of external devices to calculate the TCP and/or reference the surface of the workpiece 114.

Referring to FIG. 1, in one or more examples of the controller 100 for the tool drive 102, the controller 100 includes instructions 162 that are executable to collect the force signal 126 from the control unit 106 of the tool drive 102. The force signal 126 representing the force 108 applied to the spindle 110 of the tool drive 102 in response to engagement of the tip 112 of the tool drive 102 with the workpiece 114.

In one or more examples, the controller 100 includes the instructions 162 that are executable to collect the displacement signal 138 from the control unit 106 of the tool drive 102. The displacement signal 138 representing the displacement 118 of the spindle 110 of the tool drive 102 in response to engagement of the tip 112 of the tool drive 102 with the workpiece 114.

FIG. 12 schematically illustrates an example of the tool drive 102 being used as a locating probe (e.g., sensor). FIG. 12 also illustrates a corresponding graphical representation of current readings (e.g., force signals 126) generated by the tool drive 102 related to positions of the spindle 110 (e.g., displacement signals 138) generated by the tool drive 102. FIG. 12 illustrates an example before engagement of the tip 112 of the machining tool 166 with a measuring structure 210.

FIG. 13 schematically illustrates an example of the tool drive 102 being used as a locating probe (e.g., sensor). FIG. 13 also illustrates a corresponding graphical representation of current readings (e.g., force signals 126) generated by the tool drive 102 related to positions of the spindle 110 (e.g., displacement signals 138) generated by the tool drive 102. FIG. 13 illustrates an example after engagement of the tip 112 of the machining tool 166 with the measuring structure 210.

As illustrated in FIG. 12, before engagement of the tip 112 of the machining tool 166 (e.g., a tool bit or dedicated probe), there is no change in the force 108 and the displacement 118 of the spindle 110 and, thus, no change in the current and position reading based on the force signal 126 and the displacement signal 138. As such, the readings from the sensors 186 before engagement of the tip 112 of the machining tool 166 are used as a "zero" measurement.

As illustrated in FIG. 13, after engagement of the tip 112 of the machining tool 166, there is a change in the force 108 and the displacement 118 of the spindle 110 and, thus, a change in the current and position readings based on the force signal 126 and the displacement signal 138.

FIG. 13 also illustrates a tool center point (TCP) offset 206 that is applied to the robotic machining system 156. The TCP offset 206 compensates for a geometry of the tool drive 102.

Figure 15:
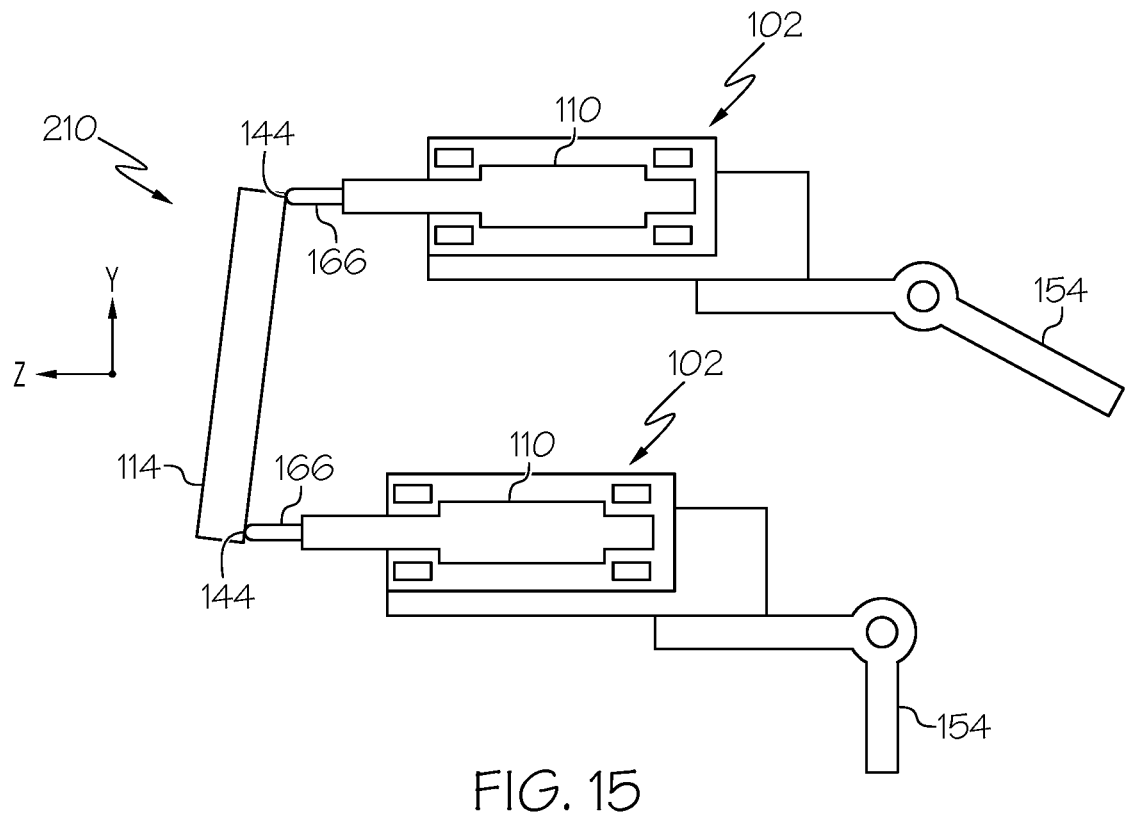
FIGS. 15 and 16 schematically illustrate an example of the tool drive used to determine a position of a workpiece.
Figure 16:
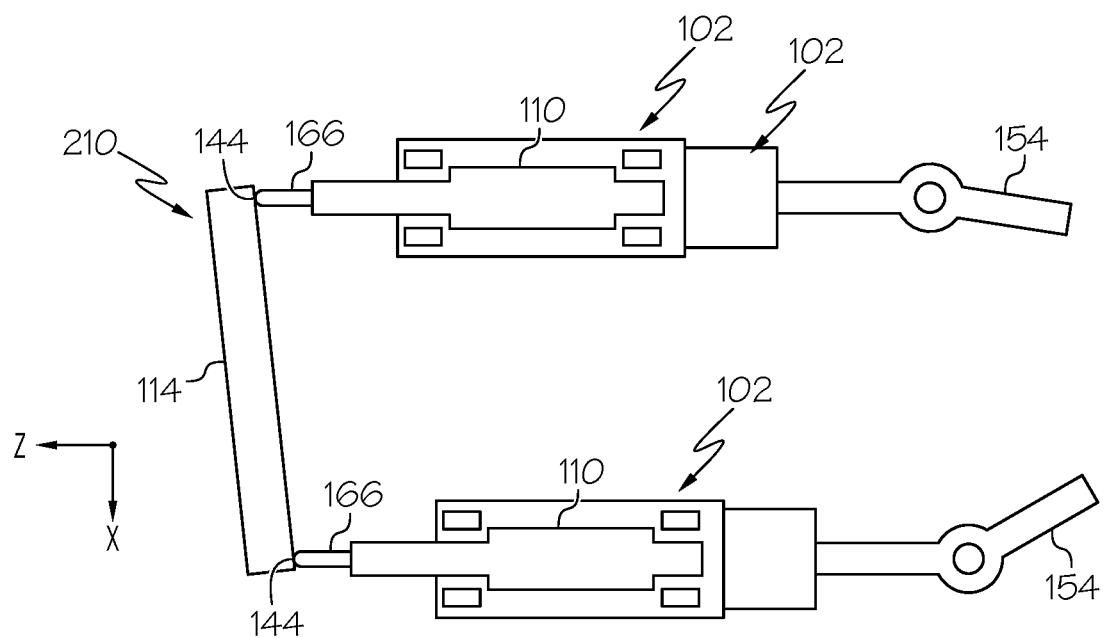

Referring now to FIGS. 14-16, which schematically illustrate examples of the tool drive 102 being used as a locating probe (e.g., sensor). In one or more examples, as shown in FIG. 14, readings from the tool drive 102 (e.g., as shown in FIG. 13) are used to locate the tip 112 of the machining tool 166 and, thus, the tool center point 148 for the robotic manipulator 154 (e.g., as compensated by the TCP offset 206). In one or more examples, as shown in FIGS. 15 and 16, readings from the tool drive 102 (e.g., as shown in FIG. 13) are used to locate the workpiece 114.

In one or more examples, the controller 100 includes the instructions 162 that are executable to use the force signal 126 and the displacement signal 138 to determine a location of the tip 112 of the tool drive 102 relative to a fixed coordinate system 140 (e.g., a machine coordinate system).

Referring to FIG. 14, in one or more examples, a point of engagement 144 between the tip 112 of the tool drive 102 and the workpiece 114 has a known location relative to the fixed coordinate system 140. In these examples, the measuring structure 210 is coupon 208 or other fixed structure having a known position (e.g., a known location and orientation) relative to the fixed coordinate system 140.

After engagement of the tip 112 of the tool drive 102 with the workpiece 114 at the point of engagement 144, the instructions 162 are executable to use the location (e.g., X, Y, Z coordinates) determined for the tip 112 of the tool drive 102 to determine the tool center point 148 (e.g., shown in FIG. 1) of the robotic manipulator 154.

In one or more examples, the tip 112 of the tool drive 102 contacts a plurality of points of engagement 144 (e.g., four points of engagement 144 are shown in FIG. 13). Known (e.g., theoretical) X, Y, Z coordinates for each one of the points of engagement 144 are provided to the controller 100 as input values. The robotic machining system 156, under direction from the controller 100 and/or the control unit 106, moves the tip 112 of the tool drive 102 to the X, Y, Z coordinate of each point of engagement 144. Upon contact, the controller reads the change in force and/or displacement (e.g., as shown in FIG. 13) to identify the X, Y, Z coordinates. The X, Y, Z coordinates are stored by the controller 100. The controller 100 is also adapted to calculate an offset needed for correct orientation and perpendicularity of the tool drive 102. The controller 100 transmits an update to the control unit 106 (e.g., a computer numerical control program) of the robotic machining system 156 with the compensated location of the tool center point 148.

Referring now to FIGS. 15 and 16, in one or more examples, the point of engagement 144 on the workpiece 114 has an unknown location relative to the fixed coordinate system 140. In these examples, the measuring structure 210 is the workpiece 114 having an unknown position (e.g., an unknown location and orientation) relative to the fixed coordinate system 140.

After engagement of the tip 112 of the tool drive 102 with the workpiece 114 at the point of engagement 144, the instructions 162 are executable to use the location determined for the tip 112 of the tool drive 102 to determine a position (e.g., actual location and orientation) of the workpiece 114 relative to the fixed coordinate system 140.

In one or more examples, the tip 112 of the tool drive 102 contacts a plurality of points of engagement 144 (e.g., four points of engagement 144 are shown in FIGS. 15 and 16). Known X, Y, Z coordinates for the tip 112 of the tool drive 102 (e.g., the tool center point 148) are provided to the controller 100 as input values. The robotic machining system 156, under direction from the controller 100 and/or the control unit 106, moves the tip 112 of the tool drive 102 into contact with each point of engagement 144. Upon contact, the controller reads the change in force and/or displacement (e.g., as shown in FIG. 13) to identify the X, Y, Z coordinates of the point of engagement 144 and, thus, the location and orientation of the workpiece 114. The X, Y, Z coordinates are stored by the controller 100. The controller 100 transmits an update to the control unit 106 (e.g., a computer numerical control program) of the robotic machining system 156 with the position information for the workpiece 114.

Figure 17:
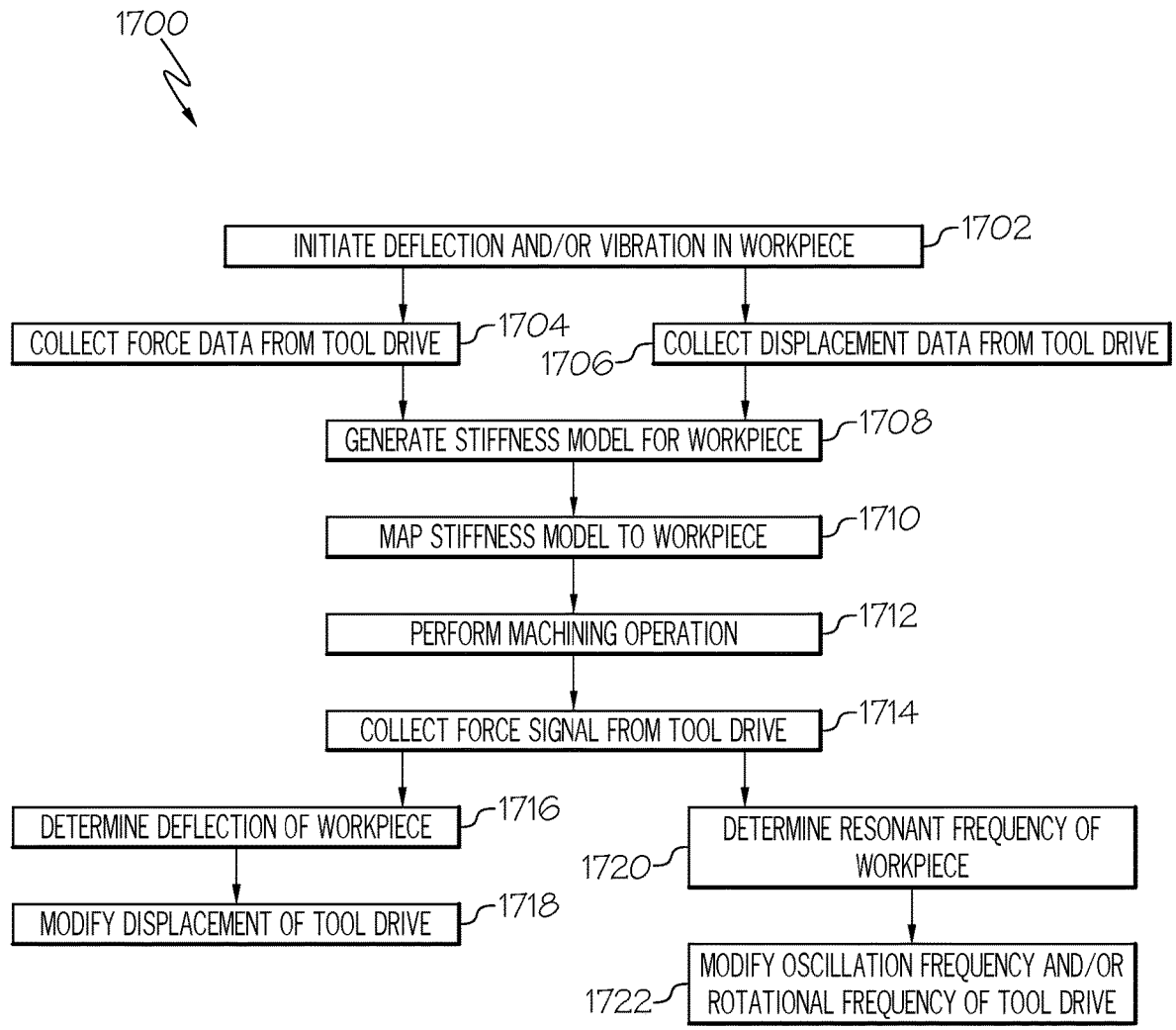
FIG. 17 is a flow diagram of an example of a method for using the tool drive.

Referring generally to FIGS. 1-11 and particularly to FIG. 17, the present disclosure is also directed to examples of a method 1700 for using the tool drive 102. Implementations of the method 1700 provide for determining the stiffness properties of the workpiece 114 and for modifying the operating parameters of the tool drive 102 to compensate for the deflection and/or vibration of the workpiece 114 during the machining operation.

Referring to FIG. 17, in one or more examples, the method 1700 includes a step of (block 1702) initiating at least one of a deflection and a vibration in the workpiece 114. In one or more examples, the deflection and/or vibration is induced in the workpiece 114 using the tool drive 102, as shown in FIG. 6.

In one or more examples, the method 1700 includes a step of (block 1704) collecting the force data 104 from the control unit 106 of the tool drive 102. The force data 104 representing the force 108 applied to the spindle 110 of the tool drive 102 in response to engagement of the tip 112 of the tool drive 102 with the workpiece 114.

In one or more examples, the method 1700 includes a step of (block 1706) collecting the displacement data 116 from the control unit 106 of the tool drive 102. The displacement data 116 representing the displacement 118 of the spindle 110 of the tool drive 102 in response to engagement of the tip 112 of the tool drive 102 with the workpiece 114.

In one or more examples, the method 1700 includes a step of (block 1708) generating the stiffness model 120 representing the workpiece 114.

In one or more examples, the stiffness model 120 is generated using the force data 104 and the displacement data 116 (e.g., as shown in FIG. 7). In these examples, the stiffness model 120 is the static stiffness model 122 (e.g., as shown in FIG. 9). The static stiffness model 122 relates the force 108 applied to the spindle 110 of the tool drive 102 to the deflection 124 of the workpiece 114.

In one or more examples, the stiffness model 120 is generated using the oscillation frequencies 132 and the vibration amplification factors 164. In these examples, the stiffness model 120 is the dynamic stiffness model 130 (e.g., as shown in FIG. 11). The dynamic stiffness model 130 relates the oscillation frequency 132 of the spindle 110 to the vibration amplification factor amplification factor 164 of the workpiece 114.

In one or more examples, the method 1700 includes a step of (block 1710) mapping the stiffness model 120 (e.g., the static stiffness model 122) to the geometry 128 of the workpiece 114. In one or more examples, the step of (block 1710) includes a step of mapping the static stiffness model 122 to the geometry 128 of the workpiece 114. In one or more examples, the step of (block 1710) mapping includes a step of mapping the dynamic stiffness model 130 to the geometry 128 of the workpiece 114. In one or more examples, the step of (block 1710) mapping includes a step of mapping the static stiffness model 122 and the dynamic stiffness model 130 to the geometry 128 of the workpiece 114.

In one or more examples, the method 1700 includes a step of (block 1712) performing the machining operation on the workpiece 114.

In one or more examples, the method 1700 includes a step of (block 1714) collecting the force signal 126 from the control unit 106 of the tool drive 102. The force signal 126 representing the force 108 applied to the spindle 110 of the tool drive 102 during machining (e.g., block 1712) of the workpiece 114.

In one or more examples, the method 1700 includes a step of (block 1716) determining the deflection 124 of the workpiece 114 using the force signal 126 and the static stiffness model 122. In one or more examples, the step of (block 1716) determining occurs or is performed during the step of (block 1712) machining the workpiece 114.

In one or more examples, the method 1700 includes a step of (block 1718) modifying the displacement 118 of the spindle 110 to compensate for the deflection 124 of the workpiece 114 using the deflection 124 determined for the workpiece 114. In one or more examples, the step of (block 1718) modifying occurs or is performed during the step of (block 1712) machining of the workpiece 114.

In one or more examples, the method 1700 includes a step of (block 1720) determining the resonant frequency 134 of the workpiece 114 using the dynamic stiffness model 130.

In one or more examples, the method 1700 includes a step of (block 1722) modifying at least one of the oscillation frequency 132 of the spindle 110 and the rotational frequency 136 of the spindle 110 to reduce vibrations in the workpiece 114 using the resonant frequency 134 determined for the workpiece 114. In one or more examples, the step of (block 1722) modifying occurs or is performed during the step of (block 1712) machining of the workpiece 114.

In one or more examples, the method 1700 includes the step of (block 1716) determining the deflection 124 of the workpiece 114 and the step of (block 1720) determining the resonant frequency 134 of the workpiece 114 using the force signal 126 and the stiffness model 120.

In one or more examples, the method 1700 includes the step of (block 1718) modifying the displacement 118 of the spindle 110 and the step of (block 1722) modifying at least one of the oscillation frequency 132 of the spindle 110 and the rotational frequency 136 of the spindle 110 using the deflection 124 and the resonant frequency 134 determined for the workpiece 114.

Figure 18:
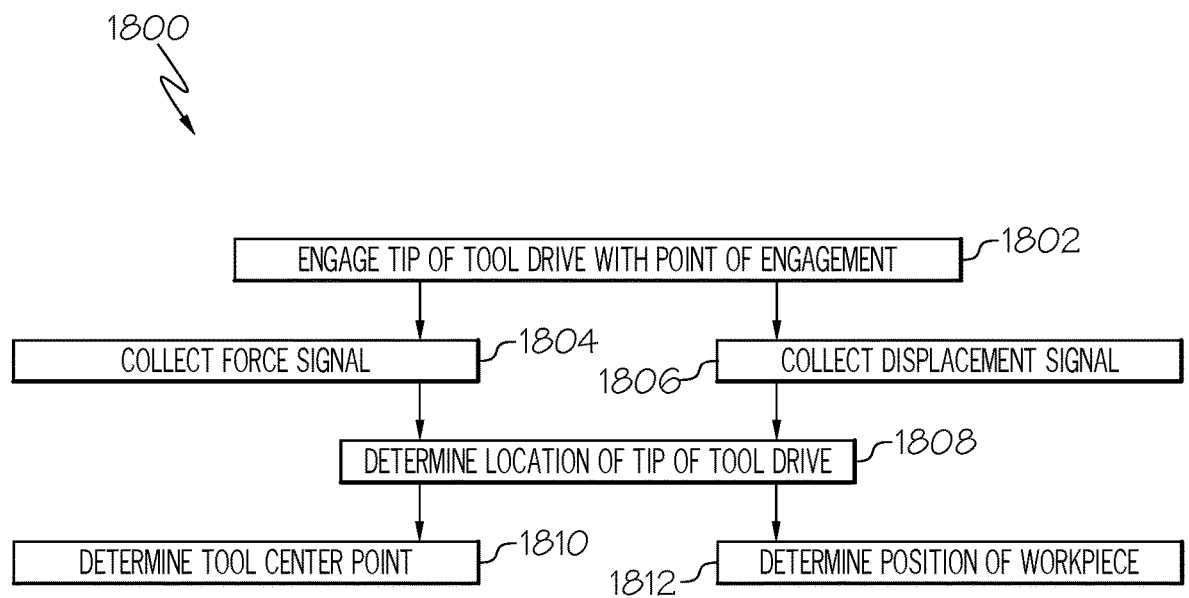
FIG. 18 is a flow diagram of an example of a method for using the tool drive.

Referring generally to FIGS. 1-4 and 12-16 and particularly to FIG. 18, the present disclosure is further directed to examples of a method 1800 for using the tool drive 102. Implementations of the method 1800 provide for determining the location of the tip 112 of the tool drive 102 and, thus, the tool center point 148 of the robotic manipulator 154 or for determining the position of the workpiece 114 from the location of the tip 112.

Referring to FIG. 18, in one or more examples, the method 1800 includes a step of (block 1802) engaging the tip 112 of the tool drive 102 with a surface of the measuring structure 210. For example, the robotic manipulator 154 moves the tip 112 of the tool drive 102 into contact with one or more points of engagement 144 (e.g., as shown in FIGS. 14-16) of the measuring structure 210.

In one or more examples, the measuring structure 210 is the coupon 208 and the point of engagement 144 has a known location (e.g., known X, Y, Z coordinates), as shown in FIG. 14. In one or more examples, the measuring structure 210 is the workpiece 114 and the point of engagement 144 has an unknown location (e.g., unknown X, Y, Z coordinates), as shown in FIGS. 15 and 16.

In one or more examples, the method 1800 includes a step of (block 1804) collecting the force signal 126 from the control unit 106 of the tool drive 102. The force signal 126 representing the force 108 applied to the spindle 110 of the tool drive 102 in response to engagement of the tip 112 of the tool drive 102 with the point of engagement 144 of the measuring structure 210.

In one or more examples, the method 1800 includes a step of (block 1806) collecting the displacement signal 138 from the control unit 106 of the tool drive 102. The displacement signal 138 representing the displacement 118 of the spindle 110 of the tool drive 102 in response to engagement of the tip 112 of the tool drive 102 with the point of engagement 144 of the measuring structure 210.

In one or more examples, the method 1800 includes a step of (block 1808) determining the location of the tip 112 of the tool drive 102 relative to the fixed coordinate system 140 using the force signal 126 and the displacement signal 138.

In one or more examples, according to the method 1800, the point of engagement 144 between the tip 112 of the tool drive 102 and the workpiece 114 has the known location relative to the fixed coordinate system 140. In one or more examples, the method 1800 includes a step of (block 1810) determining the tool center point 148 of the robotic manipulator 154 using the location determined for the tip 112 of the tool drive 102.

In one or more examples, according to the method 1800 the point of engagement 144 on the workpiece 114 has the unknown location relative to the fixed coordinate system 140. In one or more examples, the method 1800 includes a step of (block 1812) determining the position of the workpiece 114 relative to the fixed coordinate system 140 using the location determined for the tip 112 of the tool drive 102.

In one or more examples, implementations of the method 1800 are used to identify and/or locate one or more particular portions of the measuring structure 210 (e.g., the workpiece 114) or one or more particular features on the measuring structure 210 (e.g., the workpiece 114) using the tool drive 102. As an example, implementations of the method 1800 may use the tool drive 102 to identify and/or located a position (e.g., location and/or orientation) of a borehole formed in a surface of the measuring structure 210 (e.g., the workpiece 114), such as pilot holes used in aircraft assembly.

FIG. 19 schematically illustrates an example of a flow diagram of a compensation process 1900, representing the static stiffness identification phase and the production phase for compensation of the machining operation. In the identification phase, a deflection (block 1902) is introduced in the workpiece 114 and displacement measurements (block 1904) and force measurements (block 1906) are taken using the signals provided by the tool drive 102 and representing the displacement 118 and force 108 of the spindle 110 (e.g., as also shown in FIG. 6). The displacement measurements (block 1904) and force measurements (block 1906) are used to identify the stiffness (block 1908) of the workpiece 114 and generate the static stiffness model 122 (block 1910).

In the production phase, tool motion (block 1912) of the tool drive 102, such as the displacement 118 (block 1914) of the spindle 110, is provided as a process requirement. The tool motion (block 1912) and in-process force measurements (block 1916) are applied to a thrust force model (block 1920) and the static stiffness model 122 (block 1910) to determine the deflection 124 (block 1922) of the workpiece 114. The deflection 124 (block 1922) is used to provide compensated tool motion (block 1924) for the tool drive 102, such as by a modified displacement 118 (block 1926) of the spindle 110.

In one or more examples, the thrust force model (block 1920) refers to a process force model that takes into account expected material thickness (e.g., for cutting or other machining operations), material properties, feed and machining (e.g., cutting) speed, and the like. In one or more examples, the thrust force model is part of a combined stiffness and stiffness model for feed forward control. In one or more examples, the thrust force model is process force model which takes into account the expected material thickness for cutting, material properties, feed and cutting speed. In one or more examples, the thrust force model is a part of a combined stiffness and stiffness model for feed forward control. In one or more examples, the thrust force model is used to improve controller performance for stiffness compensation.

As shown in FIG. 19, the production phase may be performed iteratively throughout the machining operation to compensate the tool motion of the tool drive 102 (e.g., modify the displacement 118 of the spindle 110) as the tool drive 102 moves to different locations on the workpiece 114 throughout the machining operation.

FIG. 20 schematically illustrates an example of a flow diagram a compensation process 2000, representing the dynamic stiffness identification phase and the production phase for compensation of the machining operation. In the identification phase, an excitation (block 2002) is introduced in the workpiece 114 and displacement measurements (block 2004) and force measurements (block 2006) are taken using the signals provided by the tool drive 102 and representing the displacement 118 and force 108 of the spindle 110 (e.g., as also shown in FIG. 6). The displacement measurements (block 2004) and force measurements (block 2006) are used to identify the stiffness (block 2008) of the workpiece 114 and generate the dynamic stiffness model 130 (block 2010).

In the production phase, a frequency (block 2012) of the tool drive 102 (e.g., the oscillation frequency 132 and/or the rotational frequency 136 of the spindle 110) is provided as process limits (block 2014). The frequency (block 2012) is applied to higher harmonics (block 2016) and the dynamic stiffness model 130 (block 2010) to determine the resonant frequency 134 (block 2018) of the workpiece 114. The resonant frequency 134 (block 2018) is used with the process limits (block 2014) to provide compensated tool motion (block 2020) for the tool drive 102, such as by a modified frequency (block 2022) (e.g., modified oscillation frequency 132 and/or modified rotational frequency 136) of the spindle 110.

For the purpose of the present disclosure, the term higher harmonics refers to the harmonic (e.g., sinusoidal) excitations in vibration assisted drilling and by the spindle drive 172. Because of the nature of the cutting process, the system is excited with the original frequencies and also with its multiples (called higher harmonics). If one of these higher harmonics coincides with a resonance frequency, the system will resonate (e.g., vibrate with very high amplitudes). Examples of the controller 100, the method 1700, and/or the compensation process 2000 described herein facilitate a change to the base excitations such that all higher harmonics do not coincide with resonances.

As shown in FIG. 20, in-process measurements (block 2024) can be taken during the machining operation such that the production phase may be performed iteratively throughout the machining operation to compensate the tool motion of the tool drive 102 (e.g., modify the oscillation frequency 132 and/or the rotational frequency 136 of the spindle 110) as the tool drive 102 moves to different locations on the workpiece 114 throughout the machining operation.

Figure 21:
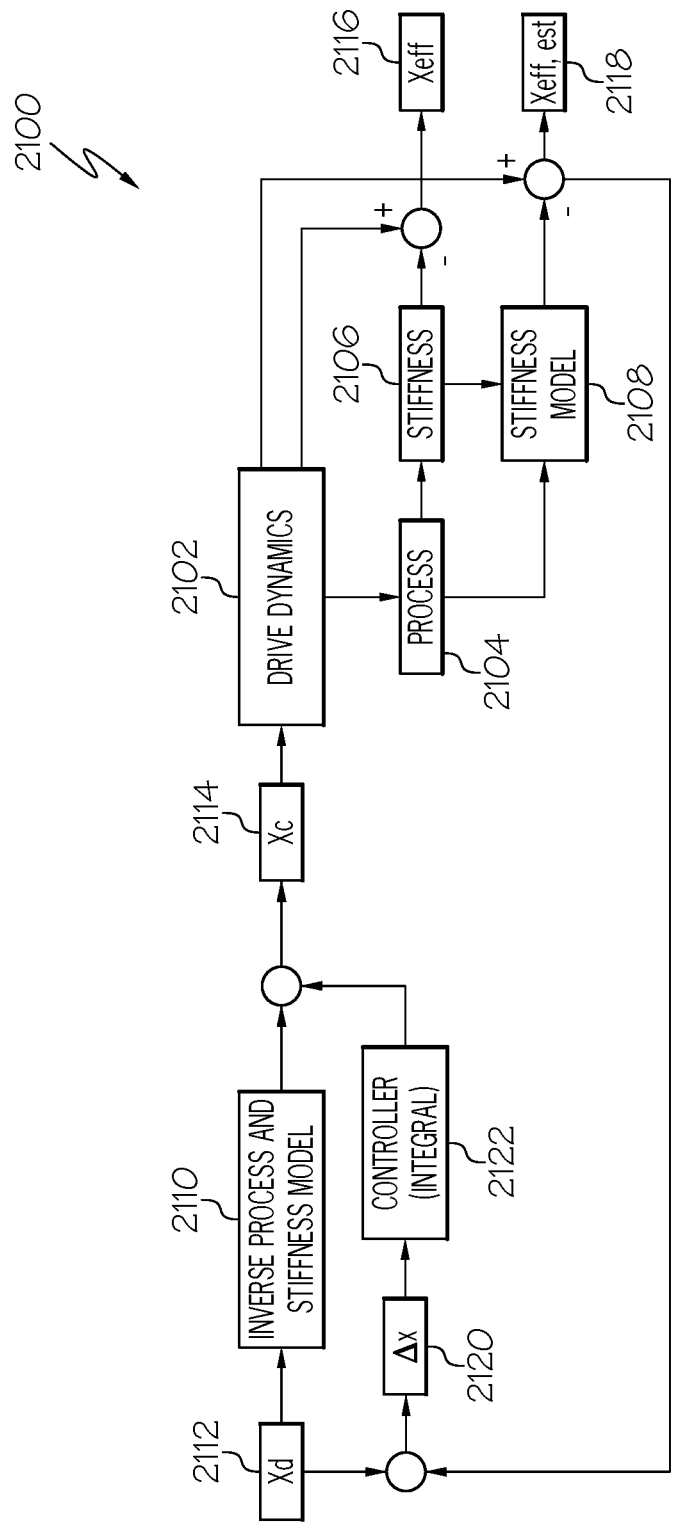
FIG. 21 is a block diagram of an example of a deflection compensation process.

Referring now to FIG. 21, which illustrates an example of a computational process 2100 for compensating for the deflection 124 in the workpiece 114. The process 2100 shown in FIG. 21 is an example of the step of (block 1718) modifying the displacement 118 of the tool drive 102 in the method 1700 (e.g., shown in FIG. 17).

As illustrated in FIG. 21, drive dynamics (block 2102), process (block 2104), and stiffness (block 2106) are inherent physical properties of the system. The blocks represent the dynamics of the actual physical components to eliminate modelling error. A stiffness model (block 2108) represents a model of the actual physical stiffness. An inverse process and stiffness model (block 2110) represents a model of the physical process and the stiffness.

As illustrated in FIG. 21, Xd (block 2112) is a desired displacement of the tool drive 102 (e.g., the spindle shaft 170) and a corresponding deflection of the workpiece 114. Xc (block 2114) is a commanded displacement of the tool drive 102 (e.g., the spindle 110). Xeff (block 2116) is an effective displacement of the tool drive 102 (e.g., the spindle 110) and a corresponding deflection of the workpiece 114. Xeff,est (block 2118) is an estimated effective displacement of the tool drive 102 (e.g., the spindle 110). Δx (block 2120) is the difference or variation in displacement, which is provided to the controller (block 2122).

Figure 22:
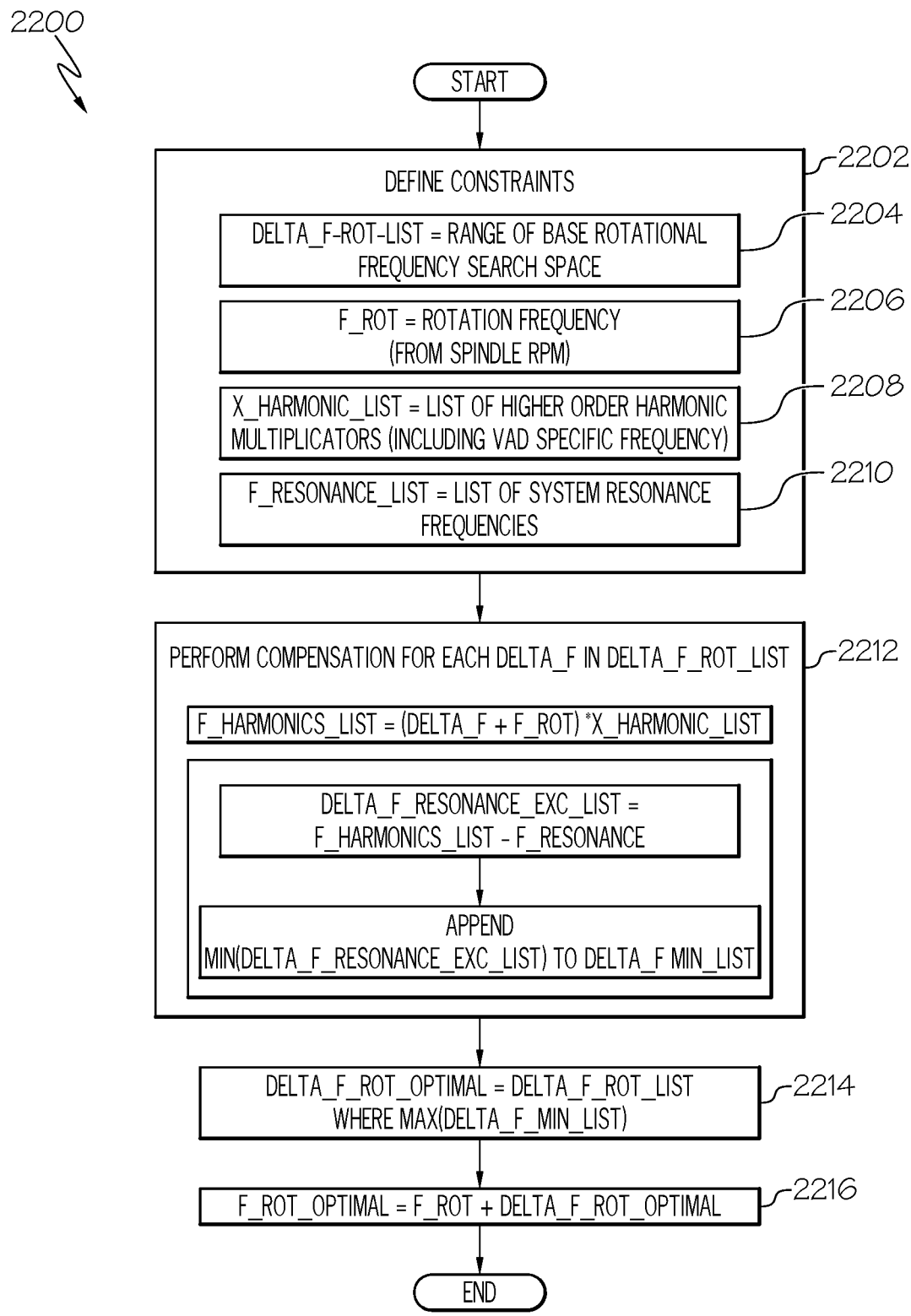
FIG. 22 is a block diagram of an example of a dynamic resonance compensation process.

Referring now to FIG. 22, which illustrates an example of a computational process 2200 for compensating for the dynamic resonance in the workpiece 114. The process 2000 shown in FIG. 22 is an example of the step of (block 1720) modifying the oscillation frequency 132 and/or the rotational frequency 136 of the tool drive 102 in the method 1700 (e.g., shown in FIG. 17).

In one or more examples, the process 2200 includes a step of (block 2202) defining constraints. In one or more examples, the constraints include DELTA_F-ROT-LIST (block 2204), F-ROT (block 2206), X_HARMONIC_LIST (block 2208), and F_RESONANCE_LIST (block 2210). DELTA_F-ROT-LIST (block 2204) refers to a range of base rotational frequencies that forms or defines a search space for execution of a compensation algorithm. As an example, DELTA_F-ROT-LIST (block 2204) is a list of possible deviations from the original rotational frequency. F-ROT (block 2206) refers to a rotational frequency of the spindle 110 (e.g., rotations per minute of the spindle shaft 170). X_HARMONIC_LIST (block 2208) refers to a list of higher order harmonic multiplicators, including, for example, vibration assisted drilling (VAD) frequencies). F_RESONANCE_LIST (block 2210) refers to a list of system resonance frequencies.

In one or more examples, the process 2200 includes a step of (block 2212) performing compensations for DELTA F. In one or more examples, compensations are performed for each DELTA_F in the DELTA_F-ROT-LIST. In one or more examples, an algorithm searches in the DELTA_F-ROT-LIST for the best change to the rotational speed that is not affected by resonances. In one or more examples, the algorithm tries every rotation frequency in a certain range (e.g., from the DELTA_F-ROT-LIST). For one particular rotation frequency, the worst case resonance frequency is selected (block 2214), for example, the one that is closest, which is the one with minimum difference to the rotation frequency. From all rotation frequencies, the maximum distance to a resonance frequency is selected (block 2216).

Figure 23:
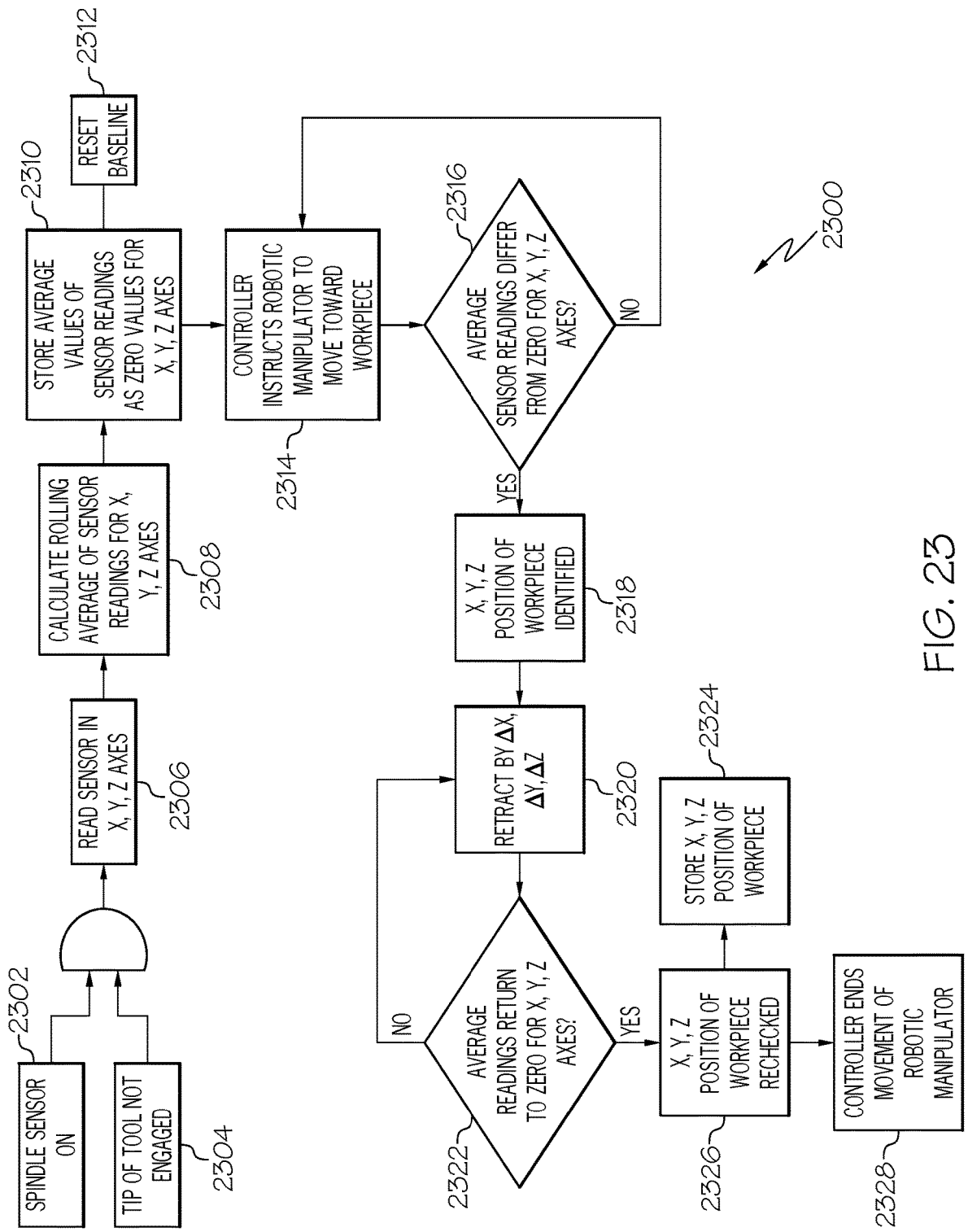
FIG. 23 is a block diagram of an example of a detection process.

Referring now to FIG. 23, which illustrates an example of an operation process 2300 for detecting a location and using the tool drive 102 (e.g., the spindle 110) as a probe. The process 2300 shown in FIG. 23 is an example of a detection algorithm and is an example of a portion of the method 1800 (e.g., shown in FIG. 18).

In the illustrated example, the process 2300 begins with the sensors 186 of the spindle 110 being activated (block 2302) and the tip 112 of the tool drive 102 not engaged (block 2304). Readings from the sensors 186 are taken in the X, Y, Z axes (block 2306). A rolling average of the sensor readings is calculated along the X, Y, Z axes (block 2308). Average values of the sensor readings are stored as zero values for the X, Y, Z axes (block 2310). The baseline of the robotic machining system 156 is reset (block 2312).

The controller 100 instructs the robotic manipulator 154 to move the tool drive 102 toward the measuring structure 210 (e.g., the workpiece 114 or the coupon 208) (block 2314). A determination is made whether average values of the sensor reading are different than the zero values for the X, Y, Z axes (block 2316). If no, then the tip 112 of the tool drive 102 is not in contact with the point of engagement 144 and the controller 100 instructs the robotic manipulator 154 to move the tool drive 102 further toward the measuring structure 210 (block 2314). If yes, then the X, Y, Z position (e.g., coordinates) of the point of engagement 144 of the measuring structure 210 is identified (block 2318).

The tool drive 102 is retracted or moved away from the measuring structure 210 by ΔX, ΔY, ΔZ (block 2320) and a determination is made whether the average values of the sensor readings return to the zero values for the X, Y, Z axes (block 2322). If no, then the tool drive 102 is further retracted or moved away from the measuring structure 210 by ΔX, ΔY, ΔZ (block 2320). If yes, then the X, Y, Z position (e.g., coordinates) of the measuring structure 210 are stored (block 2324). Optionally, the X, Y, Z position (e.g., coordinates) of the measuring structure 210 are rechecked (block 2326). The controller 100 ends movement of the robotic manipulator 154 (block 2328).

An example of using the process 2300 (e.g., shown in FIG. 23) for directly measuring the tool center point 148 of the robotic manipulator 154 (e.g., as also shown in FIG. 14) includes: (1) providing the tool center point of the robotic manipulator 154 as a known value; (2) installing the tool drive 102 on the robotic manipulator 154 such that the tool center point 148 of the robotic manipulator 154 is now unknown; (3) approaching a surface of the measuring structure 210 (e.g., the coupon 208) with the tool drive 102, in which one or more points of engagement 144 of the measuring structure 210 have a known position (e.g., known X, Y, Z coordinates); (4) reading the sensor signals 192 from the spindle 110 (e.g., from the sensors 186) before contacting the tip 112 of the tool drive 102 with the point of engagement 144; (5) setting the readings from the sensor signals 192 as "zero" values; (6) contacting the tip 112 of the tool drive 102 with the point of engagement 144; (7) reading the sensor signals 192 from the spindle 110, in which changes in the values of the sensor signals 192 (e.g., readings) indicate changes in force (e.g., current) and displacement (e.g., position) of the spindle 110 in at least one axis (e.g., Z axis); (8) using the newly acquired position (e.g., X, Y, Z coordinates along the Z-axis) at the point of engagement 144 as the new tool center point 148; and (9) providing a tool center point offset command to the control unit 106 (e.g., the computer numerical control program) of the robotic machining system 156.

An example of using the process 2300 (e.g., shown in FIG. 23) for referencing the position (e.g., location and/or orientation) of the workpiece 114 or a particular feature of the workpiece 114 (e.g., as also shown in FIGS. 15 and 16) includes steps of: (1) providing an approximated location and orientation for the workpiece 114; (2) selecting at least four points of engagement 144 on the surface of the workpiece 114 (e.g., 4 corners); (3) reading the sensor signals 192 from the spindle 110 (e.g., from the sensors 186) before contacting the tip 112 of the tool drive 102 with the point of engagement 144; (4) setting the readings from the sensor signals 192 as "zero" values; (5) contacting the tip 112 of the tool drive 102 with a first two of the points of engagement 144 (e.g., scanning in the Y-direction); (6) reading the sensor signals 192 from the spindle 110, in which changes in the values of the sensor signals 192 (e.g., readings) indicate changes in force (e.g., current) and displacement (e.g., position) of the spindle 110 to determine an offset in one direction (e.g., a Z-offset in the Y-direction); (7) contacting the tip 112 of the tool drive 102 with a second two of the points of engagement 144 (e.g., scanning in the X-direction); (8) reading the sensor signals 192 from the spindle 110, in which changes in the values of the sensor signals 192 (e.g., readings) indicate changes in force (e.g., current) and displacement (e.g., position) of the spindle 110 to determine an offset in another direction (e.g., a Z-offset in the X-direction); (9) providing the X, Y, Z coordinates of the four points of engagement 144 to the control unit 106 of the robotic machining system 156 for self-calibration and perpendicularity.

In either of the above examples, the process can be performed using the actual tool bit coupled to the spindle 110 (e.g., if there are areas of the measuring structure 210 that can be touched with slight modifications to its surface quality) or using a passive probe coupled to the spindle 110 (e.g., if there are no areas of the measuring structure 210 that can be touched with slight modifications to its surface quality).

Figure 24:
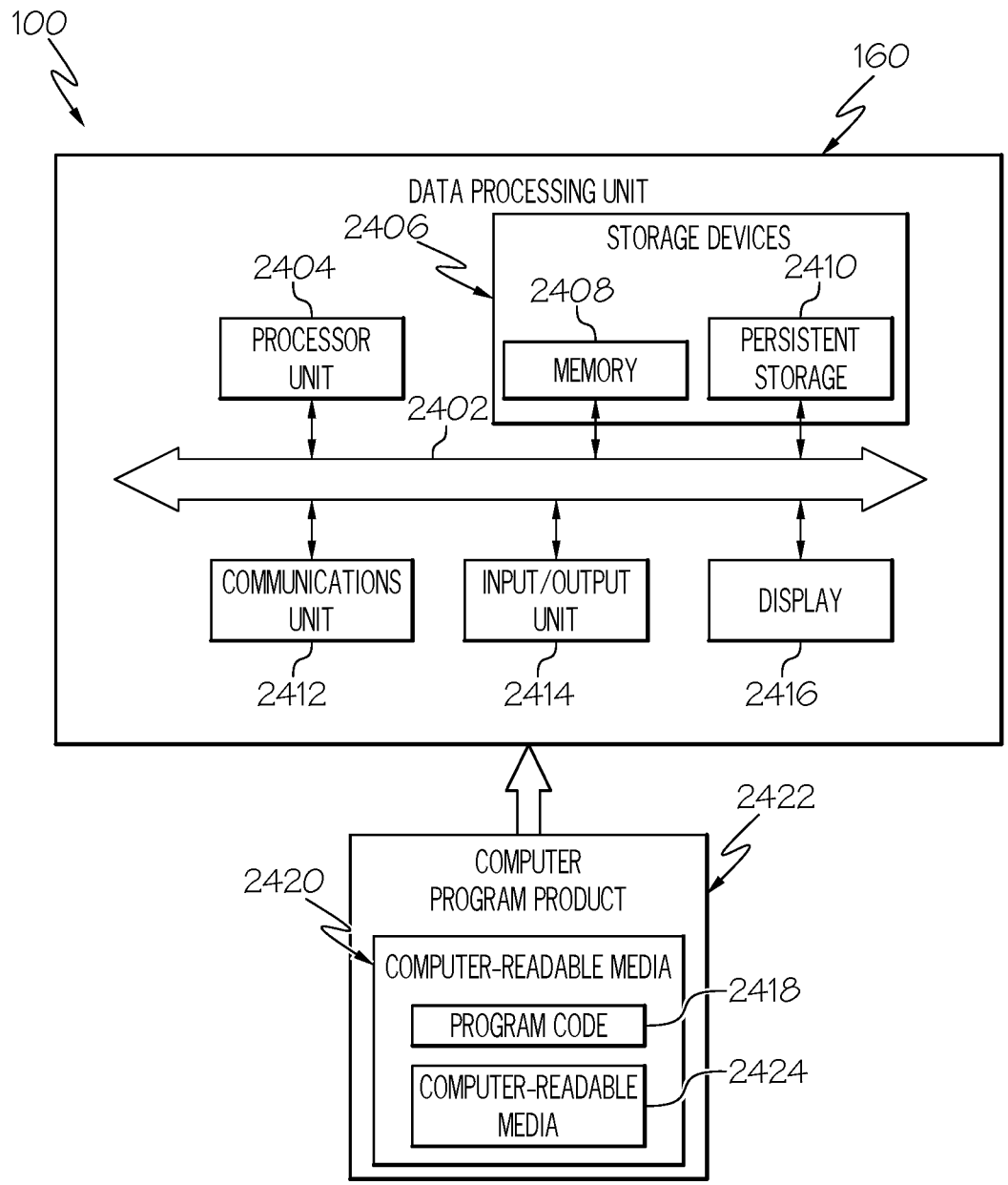
FIG. 24 is a schematic block diagram of an example of a data processing unit.

Referring now to FIG. 24, in one or more examples, the controller 100 (e.g., shown in FIG. 1) includes the data processing unit 160. In one or more examples, the data processing unit 160 includes a communications framework 2402, which provides communications between at least one processor unit 2404, one or more storage devices 2406, such as memory 2408 and/or persistent storage 2410, a communications unit 2412, an input/output (I/O) unit 2414, and a display 2416. In this example, the communications framework 2402 takes the form of a bus system.

The processor unit 2404 serves to execute instructions for software that can be loaded into the memory 2408. In one or more examples, the processor unit 2404 is a number of processors, a multi-processor core, or some other type of processor, depending on the particular implementation.

The memory 2408 and the persistent storage 2410 are examples of the storage devices 2406. A storage device is any piece of hardware that is capable of storing information, such as, for example, without limitation, at least one of data, program code in functional form, or other suitable information either on a temporary basis, a permanent basis, or both on a temporary basis and a permanent basis. The storage devices 2406 may also be referred to as computer readable storage devices in one or more examples. The memory 2408 is, for example, a random-access memory or any other suitable volatile or non-volatile storage device. The persistent storage 2410 can take various forms, depending on the particular implementation.

For example, the persistent storage 2410 contains one or more components or devices. For example, the persistent storage 2410 is a hard drive, a solid state hard drive, a flash memory, a rewritable optical disk, a rewritable magnetic tape, or some combination of the above. The media used by the persistent storage 2410 also can be removable. For example, a removable hard drive can be used for the persistent storage 2410.

The communications unit 2412 provides for communications with other data processing systems or devices. In one or more examples, the communications unit 2412 is a network interface card.

Input/output unit 2414 allows for input and output of data with other devices that can be connected to the data processing unit 160. As an example, the input/output unit 2414 provided a connection with the control unit 106 or with the spindle 110 of the tool drive 102. As another example, the input/output unit 2414 provides a connection for user input through at least one of a keyboard, a mouse, or some other suitable input device. Further, the input/output unit 2414 can send output to a printer. The display 2416 provides a mechanism to display information to a user.

Instructions for at least one of the operating system, applications, or programs can be located in the storage devices 2406, which are in communication with the processor unit 2404 through the communications framework 2402. The processes of the various examples and operations described herein can be performed by the processor unit 2404 using computer-implemented instructions, which can be located in a memory, such as the memory 2408.

The instructions are referred to as program code, computer usable program code, or computer readable program code (e.g., the instructions 162 shown in FIG. 1) that can be read and executed by a processor in processor unit 2404. The program code in the different examples can be embodied on different physical or computer readable storage media, such as the memory 2408 or the persistent storage 2410.

In one or more examples, program code 2418 is located in a functional form on computer readable media 2420 that is selectively removable and can be loaded onto or transferred to the data processing unit 160 for execution by the processor unit 2404. The program code 2418 is an example of the instructions 162 (e.g., shown in FIG. 1). In one or more examples, the program code 2418 and computer readable media 2420 form a computer program product 2422. In one or more examples, the computer readable media 2420 is computer readable storage media 2424.

In one or more examples, the computer readable storage media 2424 is a physical or tangible storage device used to store the program code 2418 rather than a medium that propagates or transmits the program code 2418.

Alternatively, the program code 2418 can be transferred to the data processing unit 160 using a computer readable signal media. The computer readable signal media can be, for example, a propagated data signal containing the program code 2418. For example, the computer readable signal media can be at least one of an electromagnetic signal, an optical signal, or any other suitable type of signal. These signals can be transmitted over at least one of communications links, such as wireless communications links, optical fiber cable, coaxial cable, a wire, or any other suitable type of communications link.

The different components illustrated for data processing unit 160 are not meant to provide architectural limitations to the manner in which different examples can be implemented. The different examples can be implemented in a data processing system including components in addition to or in place of those illustrated for the data processing unit 160. Other components shown in FIG. 24 can be varied from the examples shown. The different examples can be implemented using any hardware device or system capable of running the program code 2418.

Additionally, various components of the controller 100 and/or the data processing unit 160 may be described as modules. For the purpose of the present disclosure, the term "module" includes hardware, software or a combination of hardware and software. As an example, a module can include one or more circuits configured to perform or execute the described functions or operations of the executed processes described herein (e.g., the method 1700, the method 1800, the compensation process 1900, the compensation process 2000, the process 2100, the process 2200, and the process 2300). As another example, a module includes a processor, a storage device (e.g., a memory), and computer-readable storage medium having instructions that, when executed by the processor causes the processor to perform or execute the described functions and operations. In one or more examples, a module takes the form of the program code 2418 and the computer-readable media 2420 together forming the computer program product 2422.

Figure 25:
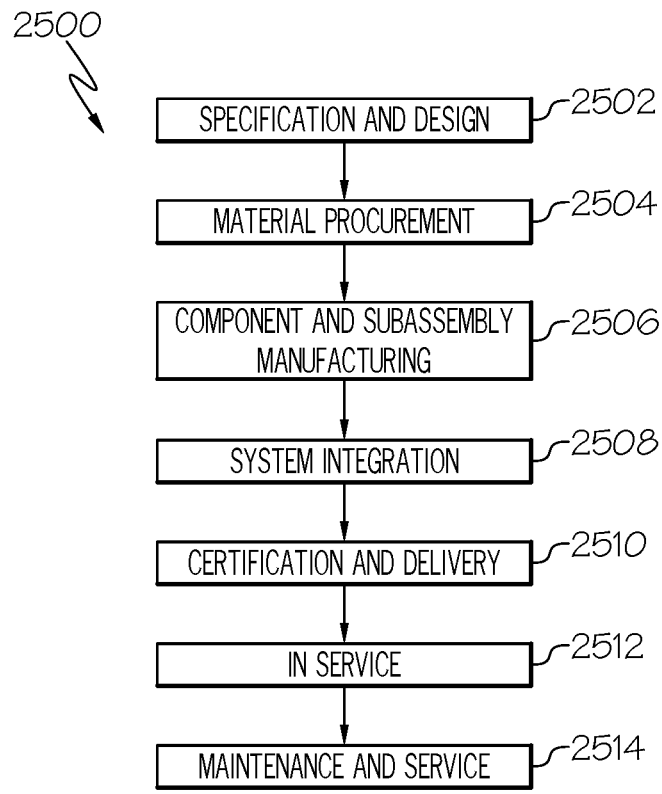
FIG. 25 is a flow diagram of an example of an aircraft service method.
Figure 26:
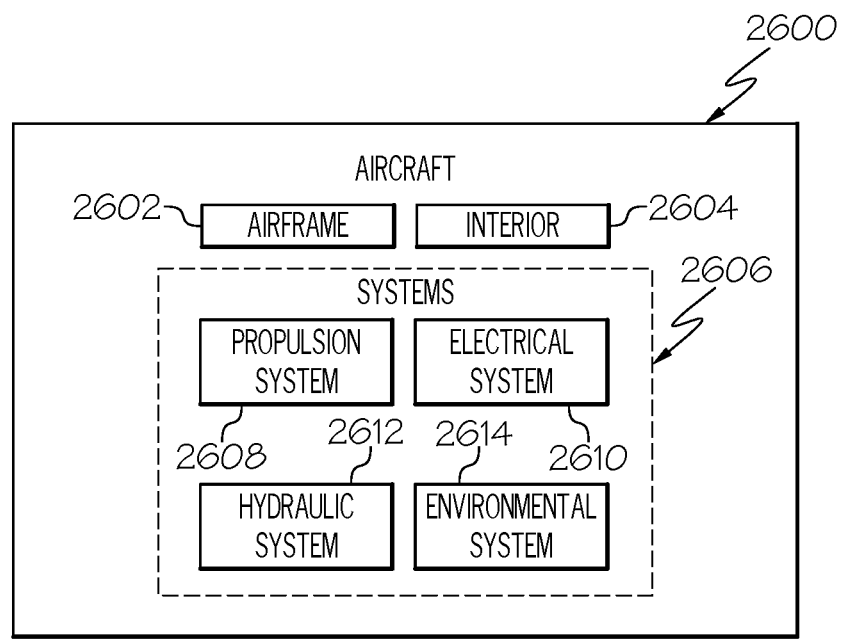
FIG. 26 is a schematic block diagram of an example of an aircraft.

Referring now to FIGS. 25 and 26, examples of the controller 100, the robotic machining system 156, the method 1700, and the method 1800 may be related to, or used in the context of, an aircraft manufacturing and service method 2500, as shown in the flow diagram of FIG. 25 and an aircraft 2600, as schematically illustrated in FIG. 26. For example, the aircraft 2600 and/or the aircraft production and service method 2500 may utilize implementations of the controller 100, the robotic machining system 156, the method 1700, and/or the method 1800 for machining a workpiece (e.g., workpiece 114) using the tool drive 102.

Referring to FIG. 26, which illustrates an example of the aircraft 2600. The aircraft 2600 also includes an airframe 2602 having an interior 2604. The aircraft 2600 includes a plurality of onboard systems 2606 (e.g., high-level systems). Examples of the onboard systems 2606 of the aircraft 2600 include propulsion systems 2608, hydraulic systems 2612, electrical systems 2610, and environmental systems 2614. In other examples, the onboard systems 2606 also includes one or more control systems coupled to an airframe 2602 of the aircraft 2600, such as for example, flaps, spoilers, ailerons, slats, rudders, elevators, and trim tabs. In yet other examples, the onboard systems 2606 also includes one or more other systems, such as, but not limited to, communications systems, avionics systems, software distribution systems, network communications systems, passenger information/entertainment systems, guidance systems, radar systems, weapons systems, and the like.

Referring to FIG. 25, during pre-production of the aircraft 2600, the method 2500 includes specification and design of the aircraft 2600 (block 2502) and material procurement (block 2504). During production of the aircraft 2600, component and subassembly manufacturing (block 2506) and system integration (block 2508) of the aircraft 2600 take place. Thereafter, the aircraft 2600 goes through certification and delivery (block 2510) to be placed in service (block 2512). Routine maintenance and service (block 2514) includes modification, reconfiguration, refurbishment, etc. of one or more systems of the aircraft 2600.

Each of the processes of the method 2500 illustrated in FIG. 25 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the controller 100, the robotic machining system 156, the method 1700, and the method 1800 shown and described herein, may be employed during any one or more of the stages of the manufacturing and service method 2500 shown in the flow diagram illustrated by FIG. 25. In an example, machining a workpiece (e.g., workpiece 114) using the controller 100 or the robotic machining system 156 or according to the method 1700 or the method 1800 may form a portion of component and subassembly manufacturing (block 2506) and/or system integration (block 2508). Further, machining a workpiece (e.g., workpiece 114) using the controller 100 or the robotic machining system 156 or according to the method 1700 or the method 1800 may be implemented in a manner similar to components or subassemblies prepared while the aircraft 2600 is in service (block 2512). Also, a workpiece (e.g., workpiece 114) machined using the controller 100 or the robotic machining system 156 or according to the method 1700 or the method 1800 may be utilized during system integration (block 2508) and certification and delivery (block 2510). Similarly, a workpiece (e.g., workpiece 114) machined using the controller 100 or the robotic machining system 156 or according to the method 1700 or the method 1800 may be utilized, for example and without limitation, while the aircraft 2600 is in service (block 2512) and during maintenance and service (block 2514).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-16, 24 and 26, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-16, 24 and 26, referred to above, need be included in every example and not all elements, features, and/or components described herein are necessarily depicted in each illustrative example. Accordingly, some of the elements, features, and/or components described and illustrated in FIGS. 1-16, 24 and 26 may be combined in various ways without the need to include other features described and illustrated in FIGS. 1-16, 24 and 26, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-16, 24 and 26, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-16, 24 and 26, and such elements, features, and/or components may not be discussed in detail herein with reference to each of FIGS. 1-16, 24 and 26. Similarly, all elements, features, and/or components may not be labeled in each of FIGS. 1-16, 24 and 26, but reference numerals associated therewith may be utilized herein for consistency.

In FIGS. 17-23 and 25, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 17-23 and 25 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the controller 100, the robotic machining system 156, the method 1700, and the method 1800, along with associated processes 1900, 2000, 2100, 2200, 2300) have been shown and described, modifications may occur to those skilled in the art upon reading the specification. The present application includes such modifications and is limited only by the scope of the claims.

What is claimed is:

1. A controller for a tool drive, the controller having instructions that are executable to:
    collect force data from a control unit of the tool drive, the force data representing a force applied to a spindle of the tool drive in response to engagement of a tip of the tool drive with a workpiece;
    collect displacement data from the control unit of the tool drive, the displacement data representing a displacement of the spindle of the tool drive in response to engagement of the tip of the tool drive with the workpiece;
    generate a stiffness model representing the workpiece using the force data and the displacement data; and
    map the stiffness model to a geometry of the workpiece.

2. The controller of claim 1, wherein the stiffness model is a static stiffness model that relates the force applied to the spindle of the tool drive to a deflection of the workpiece.

3. The controller of claim 2, wherein, after the static stiffness model is generated, the instructions are executable to:
    collect a force signal from the control unit of the tool drive of the force applied to the spindle of the tool drive during machining of the workpiece;
    use the force signal and the static stiffness model to determine the deflection of the workpiece during the machining of the workpiece; and
    use the deflection determined for the workpiece to modify the displacement of the spindle to compensate for the deflection of the workpiece during the machining of the workpiece.

4. The controller of claim 2, wherein the instructions are executable to map the static stiffness model to the geometry of the workpiece such that the force data and the displacement data are mapped to locations on a surface of the workpiece.

5. The controller of claim 1, wherein the stiffness model is a dynamic stiffness model that relates an oscillation frequency of the spindle to a vibration amplification factor of the workpiece.

6. The controller of claim 5, wherein, after the dynamic stiffness model is generated, the instructions are executable to:
   determine a resonant frequency of the workpiece from the dynamic stiffness model; and
   use the resonant frequency determined for the workpiece to modify at least one of the oscillation frequency of the spindle and a rotational frequency of the spindle to reduce vibrations in the workpiece during machining of the workpiece.

7. The controller of claim 6, wherein the instructions are executable to map the dynamic stiffness model to the geometry of the workpiece such that the resonant frequency is mapped to locations on a surface of the workpiece.

8. The controller of claim 1, wherein:
   the stiffness model comprises a static stiffness model and a dynamic stiffness model;
   the static stiffness model relates the force applied to the spindle of the tool drive to a deflection of the workpiece; and
   the dynamic stiffness model relates an oscillation frequency of the spindle to a vibration amplification factor of the workpiece.

9. The controller of claim 8, wherein the instructions are executable to map the static stiffness model and the dynamic stiffness model to the geometry of the workpiece.

10. The controller of claim 8, wherein, after the stiffness model is generated, the instructions are executable to:
   collect a force signal from the control unit of the tool drive of the force applied to the spindle of the tool drive during machining of the workpiece;
   use the force signal and the stiffness model to determine the deflection of the workpiece and resonant frequency of the workpiece during the machining of the workpiece; and
   use the deflection and the resonant frequency determined for the workpiece to modify at least one of the displacement of the spindle, the oscillation frequency of the spindle, and a rotational frequency of the spindle during the machining of the workpiece.

11. A controller for a tool drive, the controller having instructions that are executable to:
   collect a force signal from a control unit of the tool drive, the force signal representing a force applied to a spindle of the tool drive in response to engagement of a tip of the tool drive with a workpiece;
   collect a displacement signal from the control unit of the tool drive, the displacement signal representing a displacement of the spindle of the tool drive in response to engagement of the tip of the tool drive with the workpiece; and
   use the force signal and the displacement signal to determine a location of the tip of the tool drive relative to a fixed coordinate system and a position of the workpiece relative to the fixed coordinate system from the location of the tip.

12. The controller of claim 11, wherein:
   a point of engagement between the tip of the tool drive and the workpiece has a known location relative to the fixed coordinate system; and
   after engagement of the tip of the tool drive with the workpiece at the point of engagement, the instructions are executable to use the location determined for the tip of the tool drive to determine a tool center point of a robotic manipulator.

13. The controller of claim 11, wherein:
   a point of engagement on the workpiece has an unknown location relative to the fixed coordinate system; and
   after engagement of the tip of the tool drive with the workpiece at the point of engagement, the instructions are executable to use the location determined for the tip of the tool drive to determine the position of the workpiece relative to the fixed coordinate system.

14. A method for using a tool drive, the method comprising steps of:
   collecting force data from a control unit of the tool drive, the force data representing a force applied to a spindle of the tool drive in response to engagement of a tip of the tool drive with a workpiece;
   collecting displacement data from the control unit of the tool drive, the displacement data representing a displacement of the spindle of the tool drive in response to engagement of the tip of the tool drive with the workpiece; and
   generating a stiffness model representing the workpiece using the force data and the displacement data.

15. The method of claim 14, wherein:
   the stiffness model is a static stiffness model that relates the force applied to the spindle of the tool drive to a deflection of the workpiece; and
   the method further comprises mapping the static stiffness model to a geometry of the workpiece.

16. The method of claim 15, further comprising:
   collecting a force signal from the control unit of the tool drive of the force applied to the spindle of the tool drive during machining of the workpiece;
   during the machining of the workpiece, determining the deflection of the workpiece using the force signal and the static stiffness model; and
   during the machining of the workpiece, modifying the displacement of the spindle to compensate for the deflection of the workpiece using the deflection determined for the workpiece.

17. The method of claim 14, wherein:
   the stiffness model is a dynamic stiffness model that relates an oscillation frequency of the spindle to a vibration amplification factor of the workpiece; and
   the method further comprises mapping the dynamic stiffness model to a geometry of the workpiece.

18. The method of claim 17, further comprising:
   determining a resonant frequency of the workpiece using the dynamic stiffness model; and
   during machining of the workpiece, modifying at least one of the oscillation frequency of the spindle and a rotational frequency of the spindle to reduce vibrations in the workpiece using the resonant frequency determined for the workpiece.

19. The method of claim 14, wherein:
   the stiffness model comprises:
      a static stiffness model that relates the force applied to the spindle of the tool drive to a deflection of the workpiece; and
      a dynamic stiffness model that relates an oscillation frequency of the spindle to a vibration amplification factor of the workpiece; and
   the method further comprises mapping the stiffness model to a geometry of the workpiece.

20. The method of claim 19, further comprising:
collecting a force signal from the control unit of the tool drive of the force applied to the spindle of the tool drive during machining of the workpiece;
during the machining of the workpiece, determining the deflection of the workpiece and a resonant frequency of the workpiece using the force signal and the stiffness model; and
during the machining of the workpiece, modifying at least one of the displacement of the spindle, the oscillation frequency of the spindle, and a rotational frequency of the spindle using the deflection and the resonant frequency determined for the workpiece.

21. A method for using a tool drive, the method comprising:
collecting a force signal from a control unit of the tool drive, the force signal representing a force applied to a spindle of the tool drive in response to engagement of a tip of the tool drive with a workpiece;
collecting a displacement signal from the control unit of the tool drive, the displacement signal representing a displacement of the spindle of the tool drive in response to engagement of the tip of the tool drive with the workpiece; and
determining a location of the tip of the tool drive relative to a fixed coordinate system using the force signal and the displacement signal.

22. The method of claim 21, further comprising:
engaging the tip of the tool drive with the workpiece at a point of engagement, wherein the point of engagement between the tip of the tool drive and the workpiece has a known location relative to the fixed coordinate system; and
determining a tool center point of a robotic manipulator using the location determined for the tip of the tool drive.

23. The method of claim 21,
engaging the tip of the tool drive with the workpiece at a point of engagement, wherein the point of engagement on the workpiece has an unknown location relative to a fixed coordinate system; and
determining a position of the workpiece relative to the fixed coordinate system using the location determined for the tip of the tool drive.

* * * * *